United States Patent
Kelly et al.

(10) Patent No.: US 10,196,059 B2
(45) Date of Patent: *Feb. 5, 2019

(54) VEHICLE SPEED CONTROL

(71) Applicant: Jaguar Land Rover Limited, Whitley, Coventry, Warwickshire (GB)

(72) Inventors: James Kelly, Dorridge (GB); Saleem Zuberi, Lillington Avenue (GB); Andrew Fairgrieve, Thurlaston (GB)

(73) Assignee: Jaguar Land Rover Limited, Whitley, Coventry (GB)

( * ) Notice: Subject to any disclaimer, the term of this patent is extended or adjusted under 35 U.S.C. 154(b) by 0 days.

This patent is subject to a terminal disclaimer.

(21) Appl. No.: 15/397,597

(22) Filed: Jan. 3, 2017

(65) Prior Publication Data
US 2017/0113682 A1 Apr. 27, 2017

Related U.S. Application Data

(63) Continuation of application No. 14/421,958, filed as application No. PCT/EP2013/067202 on Aug. 16, 2013, now Pat. No. 9,533,684.

(51) Int. Cl.
*B60W 30/14* (2006.01)
*B60K 28/16* (2006.01)
(Continued)

(52) U.S. Cl.
CPC .......... *B60W 30/143* (2013.01); *B60K 28/16* (2013.01); *B60K 31/02* (2013.01); *B60K 31/04* (2013.01);
(Continued)

(58) Field of Classification Search
CPC ........ B60K 31/02; B60K 28/16; B60K 31/04; B60W 30/025; B60W 30/143;
(Continued)

(56) References Cited

U.S. PATENT DOCUMENTS 6,532,407 B1  3/2003  Führer et al.
7,103,460 B1  9/2006  Breed
(Continued)

FOREIGN PATENT DOCUMENTS

CN  101326525 A  12/2008
DE  19933389 A1  2/2000
(Continued)

OTHER PUBLICATIONS

International Search Report for International application No. PCT/EP2013/067202, dated Nov. 7, 2013, 3 pages.
(Continued)

*Primary Examiner* — Gertrude Arthur Jeanglaude
(74) *Attorney, Agent, or Firm* — Reising Ethington P.C.

(57) ABSTRACT

A speed control system for a vehicle includes an electronic controller configured to automatically cause a vehicle to operate in accordance with a target speed value. The electronic controller is further configured to receive information relating to movement of at least a portion of a vehicle body or at least a portion of a body of an occupant relative to a vehicle, and to automatically adjust the value of the target speed value in dependence on the received information.

20 Claims, 10 Drawing Sheets

(51) Int. Cl.

| | |
|---|---|
| *B60K 31/02* | (2006.01) |
| *B60K 31/04* | (2006.01) |
| *B60T 8/175* | (2006.01) |
| *F16H 61/02* | (2006.01) |
| *B60W 30/02* | (2012.01) |
| *F16H 59/66* | (2006.01) |
| *B60W 10/04* | (2006.01) |
| *B60W 10/18* | (2012.01) |
| *B60W 10/20* | (2006.01) |

(52) U.S. Cl.
CPC .......... *B60T 8/175* (2013.01); *B60W 30/025* (2013.01); *F16H 61/0213* (2013.01); *B60T 2201/04* (2013.01); *B60T 2210/14* (2013.01); *B60T 2210/16* (2013.01); *B60T 2220/04* (2013.01); *B60T 2260/06* (2013.01); *B60W 10/04* (2013.01); *B60W 10/18* (2013.01); *B60W 10/20* (2013.01); *B60W 2520/10* (2013.01); *B60W 2550/141* (2013.01); *B60W 2720/10* (2013.01); *B60W 2720/30* (2013.01); *B60Y 2200/20* (2013.01); *F16H 59/66* (2013.01); *F16H 2061/0234* (2013.01)

(58) Field of Classification Search
CPC .. F16H 61/0213; B60T 8/175; B60T 2210/16; B60T 2201/04; B60T 2210/14; B60T 2220/04; B60T 2260/06
USPC ....................................... 701/93, 96; 180/271
See application file for complete search history.

(56) References Cited

U.S. PATENT DOCUMENTS

| | | | |
|---|---|---|---|
| 7,421,321 | B2 | 9/2008 | Breed et al. |
| 7,925,395 | B2 | 4/2011 | Yamashita et al. |
| 9,533,684 | B2 * | 1/2017 | Kelly .................. B60W 30/025 |

FOREIGN PATENT DOCUMENTS

| | | | |
|---|---|---|---|
| DE | 102005041853 | A1 | 3/2007 |
| GB | 2499461 | A | 8/2013 |
| JP | 2002521272 | A | 7/2002 |
| JP | 2008298979 | A | 12/2008 |
| JP | 2012030760 | A | 2/2012 |
| WO | WO2007070160 | A2 | 6/2007 |
| WO | WO2007141936 | A | 12/2007 |
| WO | WO2010049769 | A1 | 5/2010 |

OTHER PUBLICATIONS

Written Opinion for International application No. PCT/EP2013/067202, dated Nov. 7, 2013, 5 pages.
Combined Search and Examination Report for application No. GB1314728.5, dated Mar. 26, 2014, 8 pages.
Chinese Office Action in Chinese with English summary for CN application No. 201380053902.5, dated Jul. 27, 2016, 14 pages.
Japanese Office Action in Japanese with English translation for JP application No. 2016-213763, dated Sep. 19, 2017, 7 pages.
Japanese Office Action in Japanese with English summary for JP application No. 2016-213763, dated May 16, 2017, 9 pages.

* cited by examiner

VEHICLE SPEED CONTROL

CROSS-REFERENCE TO RELATED APPLICATIONS

This application is a continuation of U.S. Ser. No. 14/421,958, filed Feb. 16, 2015, now U.S. Pat. No. 9,533,684 issued Jan. 3, 2017, which is a 371 National Stage entry of PCT/EP2013/067202 filed Aug. 16, 2013, the entire contents of which are hereby incorporated by reference.

INCORPORATION BY REFERENCE

The content of co-pending UK patent applications GB1214651.0 and GB1202879.1 are hereby incorporated by reference. The content of U.S. Pat. No. 7,349,776 and co-pending international patent application PCT/EP2013/053385 are incorporated herein by reference. The content of UK patent applications GB1111288.5, GB1211910.3 and GB1202427.9 are also incorporated herein by reference.

FIELD OF THE INVENTION

The invention relates to a system for controlling the speed of a vehicle. In particular, but not exclusively, the invention relates to a system for controlling the speed of a land-based vehicle which is capable of driving in a variety of different and extreme terrains and conditions.

BACKGROUND

In known vehicle speed control systems, typically referred to as cruise control systems, the vehicle speed is maintained on-road once set by the user without further intervention by the user so as to improve the driving experience for the user by reducing workload. Cruise control is settable by the vehicle driver, typically by pressing a button when the vehicle is at the desired speed. Plus and minus buttons provide for incremental speed variation whilst the cruise control is set. Cruise control generally cannot be enabled at less than a predetermined speed, e.g. 30 kph, to avoid use in non-highway driving, such as in an urban environment.

When the user has selected a speed at which the vehicle is to be maintained, the vehicle is maintained at that speed for as long as the user does not apply a brake or, in the case of a vehicle having a manual transmission, depress a clutch pedal. The cruise control system takes its speed signal from a driveshaft speed sensor or wheel speed sensors. When the brake or the clutch is depressed, the cruise control system is disabled so that the user can override the cruise control system to change the vehicle speed without resistance from the system. If the user depresses the accelerator pedal the vehicle speed will increase, but once the user removes his foot from the accelerator pedal the vehicle reverts to the pre-set cruise speed by coasting.

Such systems are usually operable only above a certain speed, typically around 15-20 kph, and are ideal in circumstances in which the vehicle is travelling in steady traffic conditions, and particularly on highways or motorways. In congested traffic conditions, however, where vehicle speed tends to vary widely, cruise control systems are ineffective, and especially where the systems are inoperable because of a minimum speed requirement. A minimum speed requirement is often imposed on cruise control systems so as to reduce the likelihood of low speed collision, for example when parking. Such systems are therefore ineffective in certain driving conditions (e.g. low speed) and are set to be automatically disabled in circumstances in which a user may not consider it to be desirable to do so.

More sophisticated cruise control systems are integrated into the engine management system and may include an adaptive functionality which takes into account the distance to the vehicle in front using a radar-based system. For example, the vehicle may be provided with a forward-looking radar detection system so that the speed and distance of the vehicle in front is detected and a safe following speed and distance is maintained automatically without the need for user input. If the lead vehicle slows down, or another object is detected by the radar detection system, the system sends a signal to the engine or the braking system to slow the vehicle down accordingly, to maintain a safe following distance.

Known cruise control systems also cancel in the event that a wheel slip event is detected requiring intervention by a traction control system (TCS) or stability control system (SCS). Accordingly, they are not well suited to maintaining vehicle progress when driving in off road conditions where such events may be relatively common.

Some vehicles are adapted for off-highway use, and it would be desirable to provide low-speed cruise control for such vehicles so as to permit progress to be maintained over rough terrain. In off-highway conditions cruise control may permit a driver, particularly a novice driver, to concentrate upon activities such as steering.

Off-highway conditions vary considerably in practice, so that it would be desirable to allow cruise control to be applied in an adaptive manner best able to permit an appropriate maximum speed of travel.

It is against this background that the present invention has been conceived. Embodiments of the invention may provide an apparatus, a method or a vehicle which addresses the above problems. Other aims and advantages of the invention will become apparent from the following description, claims and drawings.

It is also known to provide a control system for a motor vehicle for controlling one or more vehicle subsystems. U.S. Pat. No. 7,349,776 discloses a vehicle control system comprising a plurality of subsystem controllers including an engine management system, a transmission controller, a steering controller, a brakes controller and a suspension controller. The subsystem controllers are each operable in a plurality of subsystem function modes. The subsystem controllers are connected to a vehicle mode controller which controls the subsystem controllers to assume a required function mode so as to provide a number of driving modes for the vehicle. Each of the driving modes corresponds to a particular driving condition or set of driving conditions, and in each mode each of the sub-systems is set to the function mode most appropriate to those conditions. Such conditions are linked to types of terrain over which the vehicle may be driven such as grass/gravel/snow, mud and ruts, rock crawl, sand and a highway mode known as 'special programs off' (SPO). The vehicle mode controller may be referred to as a Terrain Response (TR) (RTM) System or controller. The driving modes may also be referred to as terrain modes, terrain response modes, or control modes.

SUMMARY

In an aspect of the invention for which protection is sought there is provided a speed control system for a vehicle, comprising: means for automatically causing a vehicle to operate in accordance with a target speed value, means for receiving information relating to movement of at least a portion of a vehicle body or at least a portion of a body of an occupant relative to a vehicle, and means for adjusting automatically the value of the target speed value in dependence on said information.

The portion of the occupant body may be a head or any other suitable portion.

Optionally the means for automatically causing a vehicle to operate in accordance with a target speed value comprises an electric controller configured to automatically cause a vehicle to operate in accordance with a target speed value.

Optionally the means for receiving information relating to movement of at least a portion of a vehicle or at least a portion of a body of an occupant relative to a vehicle comprises the electric controller being configured to receive electrical signals indicative of movement of at least a portion of a vehicle or at least a portion of a body of an occupant relative to a vehicle The means for adjusting automatically the value of the target speed value in dependence on said information may comprise the electric controller being configured to output a signal to automatically adjust the value of the target speed value.

It is to be understood that the controller may comprise a plurality of computing devices, electronic control units or the like. That is, embodiments of the present invention falling within the scope of the appended claims include control systems in which required functionality according to the present invention is distributed between a plurality of controllers.

Advantageously the controller is configured to determine the target speed value in dependence at least in part on a signal indicative of a measured comfort level, the signal indicative of measured comfort level being determined at least in part in dependence on the movement of the at least a portion of the vehicle body or the at least a portion of the body of an occupant.

The signal indicative of comfort level may be referred to as a comfort parameter or an excitation parameter in some embodiments. The comfort or excitation parameter may provide a direct measure of occupant body movement or an indirect measure, by reference to vehicle body movement.

The controller may be further configured to determine an amount by which the target speed should be adjusted from the current value in dependence at least in part on the signal indicative of measured comfort level.

Advantageously the controller may be configured to determine the target speed value in dependence at least in part on vehicle body pitch angular acceleration, vehicle body roll angular acceleration and vehicle body heave acceleration.

The controller may be configured to determine the value of the signal indicative of comfort level in dependence at least in part on vehicle body pitch angular acceleration, vehicle body roll angular acceleration and vehicle body heave acceleration.

The controller may be configured to determine the target speed value in further dependence on at least one parameter associated with movement of the vehicle over terrain selected from amongst steering angle, vehicle speed, steering angle as a function of vehicle speed, a value of driving surface side slope; a driving surface gradient; and an amount of vehicle suspension articulation or suspension warp.

The controller may be configured to determine a comfort derived maximum speed value dependent upon the signal indicative of measured comfort level and at least one further maximum speed value, the system being operable to cause the value of target speed to be set to the lower of the comfort derived maximum speed value and the at least one further maximum speed value Advantageously the at least one further maximum speed value includes a user defined speed value corresponding to a maximum speed at which the user wishes to travel.

Optionally the at least one further maximum speed value includes a speed value being a maximum speed appropriate to an instant value of at least one further parameter associated with movement of the vehicle over terrain.

The at least one parameter may include for example steering angle, vehicle speed, steering angle as a function of vehicle speed, a value of driving surface side slope; a driving surface gradient; and an amount of vehicle suspension articulation or suspension warp.

The one or more maximum speed values may be values determined empirically for given values of one or more parameters.

Optionally the controller is configured to iteratively adjust the value of the target speed to reduce a difference between the signal indicative of measured comfort level and a prescribed value or a prescribed range of values.

Advantageously the controller may be configured to calculate a value of desired vehicle acceleration or speed change in dependence on the value of the signal indicative of measured comfort level thereby to adjust the value of the target speed to reduce the difference between the signal indicative of measured comfort level and a prescribed value or a prescribed range of values.

The system may calculate a target value of vehicle acceleration that may be imposed on the vehicle in order to cause the vehicle to travel at a speed at which the comfort parameter has a prescribed value or is within a prescribed range of values.

The value of vehicle acceleration may be arranged to be positive when the signal indicative of measured comfort level is in a first range of values and negative when the signal indicative of measured comfort level is in a second range of values different from the first range.

Embodiments of the invention have the advantage that a speed in accordance with which a vehicle controller causes a vehicle to operate may be adjusted in dependence on vehicle or occupant body movement thereby to attempt to maintain the value of signal indicative of measured comfort level at a prescribed value or within a prescribed range of values.

As indicated above, the present applicant has identified that vehicle body movement is a very useful indicator of occupant comfort because occupant body movement correlates directly with vehicle body movement.

The electric controller may be configured to receive a user input electrical signal and based on said user input electrical signal the electric controller may be further configured to manipulate the amount by which the target speed value is adjusted.

The user input electrical signal to manipulate the amount by which the target speed value is adjusted may be input by means of a control knob, a touch screen, a button or any other suitable means.

Optionally, based on the user input electrical signal the controller is configured to manipulate the value of the signal indicative of measured comfort level thereby to control the amount by which the target speed value is adjusted.

The system may therefore permit the system to increase the level of comfort enjoyed by a vehicle occupant, or decrease the level of comfort. This feature may therefore be described as a comfort setting in some embodiments.

Instead of changing the value of the signal indicative of comfort level directly, the system may change a value of a reference comfort value. The system may be configured to compare the signal indicative of measured comfort with the reference comfort value in order to determine by how much to adjust the target speed value.

Thus, based on the user input electrical signal the controller may be configured to manipulate a value of a reference signal, the controller being further configured to compare the reference signal to the signal indicative of measured comfort thereby to control the amount by which the target speed value is adjusted.

The controller may be configured to control the amount by which the target speed value is adjusted in dependence upon the difference between the manipulated value of the reference signal and the signal indicative of measured comfort.

The controller may be configured to adjust the target speed value in dependence on data in respect of seat occupancy.

The system may be operable to adjust the value of target speed to a lower value if an occupant is present in addition to a driver, for example by reference to a passenger detector in a seat, by reference to a seat belt buckle status, or any other suitable means.

In an embodiment, the system is further provided with a memory. The speed control system may be operable to log data in respect of by how much a user adjusts the means for adjusting automatically the target speed value and to recall the data when certain conditions are met. For example the system may associate data with a particular user and recall the data when it recognizes that the user is an occupant of the vehicle, for example a driver. The system may be operable to distinguish between users based on a unique identifier associated with a key fob, by means of a facial recognition system or any other suitable means.

In operation, the system may be configured to log in the memory how the user adjusts the speed control comfort setting. For example, how the user adjusts the comfort setting for a given amplitude and frequency of vehicle body movement or vibration caused by the terrain over which the vehicle is driving.

If the user overrides the system to cause an increase or decrease in vehicle speed by adjusting the means for adjusting automatically the value of target speed, the fact that the system was over-ridden may be stored in the memory. A look-up table may be updated or a specific look up table associated with that driver may be generated. The look-up table may contain data in respect of vehicle speed requested by a user as a function of, for example, vehicle vibration characteristic data. In some embodiments the speed control system updates the stored data only if the user repeatedly overrides the system.

It is to be understood that in scenarios in which a user typically uses the off-road speed control system when driving alone, the user may opt to accept less vehicle composure (and therefore higher levels of vehicle or occupant body movement) in order to drive the vehicle at a faster speed over a given surface. As the user is in control of the vehicle, the movement of the vehicle is likely to be perceived by the user as being in line with their expectations and therefore acceptable. Furthermore, a driver may steady him or herself against a steering wheel and therefore tolerate more vehicle body movement than a passenger might be comfortable with. A passenger, who is not in control of the vehicle, may perceive the same vehicle movement or vibration as being unacceptably uncomfortable. To compensate for this, in some embodiments, when the system detects that the vehicle is carrying one or more passengers, the system defaults to a comfort and composure orientated speed adjustment mode, unless and until the user manually overrides the setting.

In the event a user overrides the speed control system, indicating that they feel the speed is too high, the system may determine whether the user chose to override the system because of a feature of terrain over which the vehicle is travelling, or because of another factor influencing vehicle body movement. An example of such a factor might be an action by a driver such as abrupt turning of the steering wheel on terrain that would otherwise not cause excessive user discomfort. In some embodiments the system may take into account vehicle roll angle; for example if the vehicle is driving across a gradient a user may be more sensitive to the fact that the vehicle is tilted about its longitudinal axis, and require the system to reduce the set speed even when the terrain is relatively smooth.

Thus it is to be understood that the speed control system may be configured to log data indicating steering wheel angle, steerable road wheel angle or rate of change of one or both, optionally vehicle roll angle, lateral acceleration and the like and be able to determine whether the fact that a user chose to over-ride the speed control system to reduce set speed is because of terrain roughness alone or because of a combination of terrain roughness and one or more other parameters affecting body movement. The system may be configured to take into account whether or not passengers are being carried when a user intervenes to reduce set speed. In the event passengers are not being carried, the vehicle may determine that if a similar scenario is encountered when passengers are being carried in the future, set speed may be reduced to an even lower level than that to which it was reduced when the user was the sole occupant. Furthermore, the system may be operable to reduce set speed when reduced values of one or more parameters affecting vehicle body roll are detected in the future, in the expectation that passengers may be less tolerant of certain body movements than a driver. Furthermore, such action may be prudent also since a centre of gravity of a vehicle may rise in the presence of one or more passengers, resulting in an increased tendency for a vehicle body to move when travelling over certain terrain. In this way, vehicle body movement, whilst the vehicle is under control of the speed control system (e.g., low-speed progress (LSP) control system and/or a cruise control system), may be managed at least in part, to balance the desire to maintain good progress off-road with the need to manage certain factors that may influence or otherwise affect the comfort of each occupant of the vehicle.

In an embodiment, the LSP control system is operable to receive data indicative of seat occupancy of the vehicle. That is, data indicative as to whether a given seat of the vehicle other than a driver's seat is occupied. For example, the LSP control system may receive data corresponding to a state of a switch embedded in a seat belt buckle associated with each seat. If the state of the switch indicates that the buckle is fastened, the LSP control system considers that the seat associated with the buckle is occupied. If the state of the switch indicates the buckle is unfastened, the LSP control system may consider that the seat associated with the buckle is unoccupied. Seat occupancy may be determined by sensors in each seat or by means of an infrared or visible light camera arranged to observe an interior of an occupant compartment such as a vehicle cabin. Other means for determining seat occupancy are also useful. The memory of or associated with the LSP control system may be divided so as to store data in respect of a plurality of known drivers and their associated preferences. The system may be arranged to identify a driver by identification of one selected from amongst a seat adjustment position, a user specific key fob identity, or other known means. In one arrangement a camera may be provided to determine the occupant's movement relative to the vehicle, and such information is included within the definition of vehicle related information. The comfort level may be determined by one of more of the magnitude and frequency of the occupant's movement relative to the vehicle.

In some embodiments, the target speed or maximum speed (set-speed limit) imposed automatically by the system may be adjusted automatically by the system based on duration and vehicle behaviour in dependence on a determination that vehicle body acceleration exceeds a predetermined threshold. This may be used to enhance vehicle composure and act as a means for determining vehicle movement independently of an output of one or more wheel speed sensors. This may be useful in situations in which no two wheel speed readings match each other.

This feature may be employed across multiple vehicle variants with different suspension spring/damper settings and be used in vehicles whose characteristics may vary over time. Employment of vehicle body acceleration measurements may free the speed control system from being tied to a specific vehicle or suspension variant.

The system may further comprise an imaging device that monitors movement of the at least a portion of the body of an occupant. The imaging device may be a camera device.

In a further aspect of the invention for which protection is sought there is provided a vehicle comprising a system according to a preceding aspect.

In a still further aspect of the invention for which protection is sought there is provided a method of operating a speed control system of a vehicle, said method comprising: automatically causing a vehicle to operate in accordance with a target speed value; receiving information relating to movement of at least a portion of a vehicle body or at least a portion of a body of an occupant relative to a vehicle; and adjusting automatically the value of the target speed value in dependence on said information.

The method may further comprise determining the target speed value in dependence at least in part on a signal indicative of a measured comfort level, the signal indicative of measured comfort level being determined at least in part in dependence on the movement of the at least a portion of the vehicle body or the at least a portion of the body of an occupant.

The method may comprise determining an amount by which the target speed should be adjusted from the current value in dependence at least in part on the signal indicative of measured comfort level.

Advantageously the method comprises determining the target speed value in dependence at least in part on vehicle body pitch angular acceleration, vehicle body roll angular acceleration and vehicle body heave acceleration.

Further advantageously the method comprises determining the value of the signal indicative of comfort level in dependence at least in part on vehicle body pitch angular acceleration, vehicle body roll angular acceleration and vehicle body heave acceleration.

The method may comprise determining the target speed value in further dependence on at least one parameter associated with movement of the vehicle over terrain selected from amongst steering angle, vehicle speed, steering angle as a function of vehicle speed, a value of driving surface side slope; a driving surface gradient; and an amount of vehicle suspension articulation or suspension warp.

The method may comprise determining a comfort derived maximum speed value dependent upon the signal indicative of measured comfort level and at least one further maximum speed value, and setting the value of target speed to be the lower of the comfort derived maximum speed value and the at least one further maximum speed value.

The at least one further maximum speed value may include a user defined speed value corresponding to a maximum speed at which the user wishes to travel.

The at least one further maximum speed value may include a speed value being a maximum speed appropriate to an instant value of at least one further parameter associated with movement of the vehicle over terrain.

The method may further comprise iteratively adjusting the value of the target speed to reduce a difference between the signal indicative of measured comfort level and a prescribed value or a prescribed range of values.

The method may further comprise calculating a value of desired vehicle acceleration or speed change in dependence on the value of the signal indicative of measured comfort level so as to adjust the value of the target speed to reduce the difference between the signal indicative of measured comfort level and a prescribed value or a prescribed range of values of comfort level.

The method may further comprise manipulating the amount by which the target speed value is adjusted based on a user input.

Optionally, manipulating the amount by which the target speed value is adjusted comprises manipulating the value of a signal indicative of measured comfort level thereby to control the amount by which the target speed value is adjusted.

The method may comprise manipulating the value of a reference signal and comparing the reference signal to the signal indicative of measured comfort thereby to control the amount by which the target speed value is adjusted.

The method may comprise controlling the amount by which the target speed value is adjusted in dependence upon the difference between the manipulated value of the reference signal and the signal indicative of measured comfort.

The method may further comprise adjusting the target speed value in dependence on data in respect of seat occupancy.

The method may comprise monitoring movement of the at least a portion of the body of a vehicle occupant with an imaging device.

In a further aspect of the invention for which protection is sought there is provided a carrier medium carrying a computer readable code for controlling a vehicle to carry out the method according to a preceding aspect.

In one aspect of the invention for which protection is sought there is provided a method of speed control for a vehicle implemented by a controller, said method comprising: automatically causing a vehicle to operate in accordance with a target speed value tgt_speed; obtaining a value of an occupant excitation parameter Psng_Excit; calculating a value of vehicle target acceleration tgt_accel in dependence on the value of Psng_Excit, the value of tgt_accel being positive when Psng_Excit is in a first range of values and negative when Psng_Excit is in a second range of values different from the first range, the value of Psng_Excit being responsive to vehicle body movement; and automatically causing the vehicle to operate in further dependence on the value of tgt_accel.

Embodiments of the invention have the advantage that a speed in accordance with which a vehicle controller causes a vehicle to operate may be adjusted in dependence on vehicle body movement thereby to attempt to maintain the value of Psng_Excit at a prescribed value or within a prescribed range of values.

The target acceleration may be generated in the form of a speed increment (or decrement if the increment is negative) which may also be referred to as a speed delta. The speed increment or delta may be an amount by which it is desired to change the vehicle speed in a given time period, such as a refresh cycle or speed control update cycle of the system, and therefore corresponds to an acceleration. The cycle may be a period between issuance of updated values of required target vehicle speed or required wheel torque that are employed by the system in order to achieve a required target speed value.

The present applicant has identified that vehicle body movement is a very useful indicator of occupant comfort because occupant body movement may be correlated with vehicle body movement. The value of occupant excitation parameter may therefore considered to represent a measure of a level of comfort experienced by a user.

It is to be understood that reference to abbreviated terms such as Psng_Excit and tgt_accel is not to be understood as limiting and is for the purpose of conciseness of description and ease of understanding.

It is to be understood that the controller may comprise a plurality of computing devices, electronic control units or the like. That is, embodiments of the present invention falling within the scope of the appended claims include control systems in which required functionality according to the present invention is distributed between a plurality of controllers.

Embodiments of the invention have the advantage that a speed in accordance with which a vehicle controller causes a vehicle to operate may be adjusted in dependence on vehicle body movement thereby to attempt to maintain the value of Psng_Excit at a prescribed value or within a prescribed range of values.

The present applicant has identified that vehicle body movement is a very useful indicator of passenger comfort because passenger body movement correlates directly with vehicle body movement.

It is to be understood that the controller may comprise a plurality of computing devices, electronic control units or the like. That is, embodiments of the present invention falling within the scope of the appended claims include control systems in which required functionality according to the present invention is distributed between a plurality of controllers.

The method may comprise causing the vehicle to accelerate at a rate corresponding to the value of tgt_accel subject to the limitation that vehicle speed does not exceed tgt_speed.

Thus, the controller causes the value of tgt_accel determined in dependence on the value of Psng_Excit to be imposed on vehicle speed, but to cap vehicle speed at the value of tgt_speed. This feature has the advantage that the controller may conveniently limit vehicle speed so as to attempt to maintain the value of Psng_excit at a value between the first and second ranges of values. The values of Psng_excit between the first and second ranges of values may be arranged to be values predetermined to correspond to an acceptable degree of occupant comfort. The values may be determined so as to provide an acceptable trade-off between occupant comfort level and vehicle progress. That is, it is assumed that the value of Psng_excit changes with vehicle speed in a manner corresponding to a decrease in occupant comfort such that the higher (or lower) the value of Psng_excit, the greater the amount of discomfort experienced by a vehicle occupant.

The first and second ranges of values may bound a range of values of Psng_Excit for which the value of tgt_accel is substantially zero.

It is to be understood that if the speed or range of speeds of the vehicle for which the value of tgt_accel is substantially zero is less than the value of tgt_speed at a given moment, the controller will attempt to cause the value of vehicle speed to fall for which for which tgt_accel is substantially zero.

If in this case the value of Psng_Excit subsequently changes to a value for which the value or range of values of speed for which tgt_accel is substantially zero is or are greater than tgt_speed, the vehicle speed will increase to the value tgt_speed, and be capped at this speed even through the value of tgt_accel may correspond to a positive acceleration of the vehicle.

The method may comprise changing the value of tgt_accel within each of the first and second ranges of values of Psng_Excit in such a manner as to increase a rate of change of speed of the vehicle towards a value corresponding to a value of tgt_accel of substantially zero as the magnitude of the difference between the instant value of Psng_Excit, and a value of Psng_Excit that is between the first and second ranges, increases.

Thus, as a difference between instant speed and a speed for which the value of tgt_accel is substantially zero increases, so the magnitude of tgt_accel increases in such a manner as to cause vehicle speed to change at an increasingly high rate towards a value of speed for which tgt_accel is substantially zero.

The method may comprise causing the vehicle to operate in accordance with a target speed value of an on-highway cruise control system.

Alternatively or in addition, the method may comprise causing the vehicle to operate in accordance with a target speed value of an off-highway cruise control system.

The method may comprise causing the vehicle to operate in accordance with a target speed value of an off-highway cruise control system comprises continuing to cause the vehicle to operate in accordance with the target speed value in the presence of wheel slip sufficient to cause a vehicle slip control system to intervene to reduce wheel speed thereby to reduce the value of wheel slip.

That is, the off-highway cruise control system does not terminate causing the vehicle to operate in accordance with the target speed merely because a slip control system has intervened to reduce wheel slip. It is to be understood that convention cruise control systems do terminate speed control when a slip control system intervenes. Since wheel slip events are typically more common in off-highway driving conditions, an off-highway cruise control system that does not cancel speed control in the event a slip control system intervenes to reduce wheel slip is advantageous in reducing driver workload. That is, a driver may continue to concentrate on steering the vehicle whilst the slip control system seeks to reduce slip and the off-highway speed control system continues to cause the vehicle to operate in accordance with the prevailing values of tgt_speed and tgt_accel.

The system may be operable to allow adjustment of the first and second ranges of values thereby to allow adjustment of a level of comfort experienced by a user at a given moment.

In one aspect of the invention for which protection is sought there is provided a speed control system for a vehicle implemented by a controller, said system being operable to: automatically cause a vehicle to operate in accordance with a target speed value tgt_speed; obtain a value of an occupant excitation parameter Psng_Excit; calculate a value of vehicle target acceleration tgt_accel in dependence on the value of Psng_Excit, the value of tgt_accel being positive when Psng_Excit is in a first range of values and negative when Psng_Excit is in a second range of values different from the first range, the value of Psng_Excit being responsive to vehicle body movement; and automatically cause the vehicle to operate in further dependence on the value of tgt_accel.

The system may be operable to cause the vehicle to accelerate at a rate corresponding to the value of tgt_accel, optionally a rate substantially equal to the value of tgt_accel.

In a further aspect of the invention for which protection is sought there is provided a vehicle comprising a system according to a preceding aspect.

The vehicle may have a terrain sensor for automatically detecting one of a plurality of off-highway conditions.

Within the scope of this application it is envisaged that the various aspects, embodiments, examples and alternatives, and in particular the features thereof, may be taken independently or in any combination thereof. For example, features disclosed in connection with one embodiment are applicable to all embodiments, unless such features are incompatible.

BRIEF DESCRIPTION OF DRAWINGS

The present invention will now be described, by way of example only, with reference to the accompanying drawings, in which.

DETAILED DESCRIPTION

References herein to a block such as a function block are to be understood to include reference to software code for performing the function or action specified which may be an output that is provided responsive to one or more inputs. The code may be in the form of a software routine or function called by a main computer program, or may be code forming part of a flow of code not being a separate routine or function. Reference to function block is made for ease of explanation of the manner of operation of embodiments of the present invention.

Figure 1:
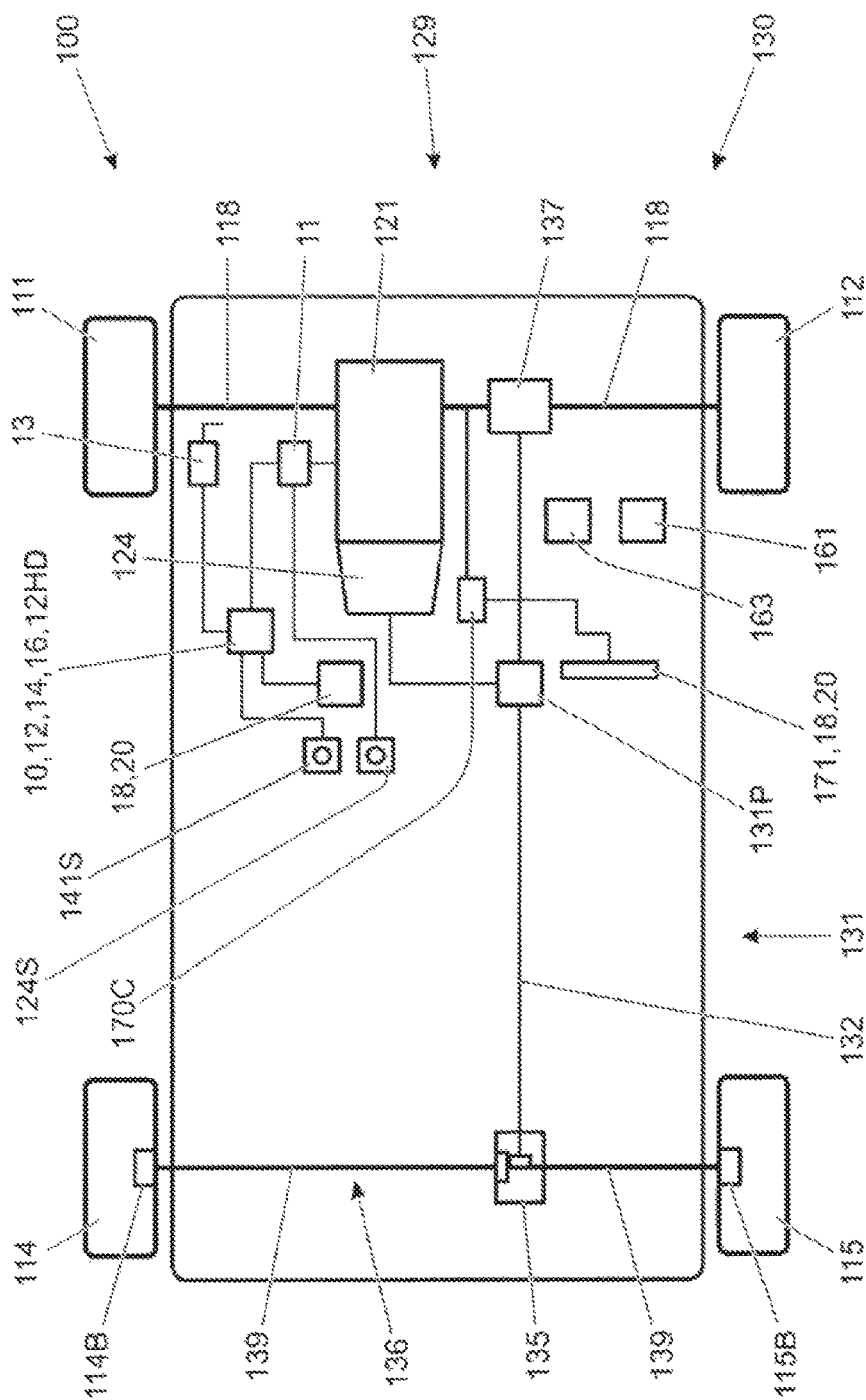
FIG. 1 is a schematic illustration of a vehicle according to an embodiment of the invention in plan view.
Figure 2:
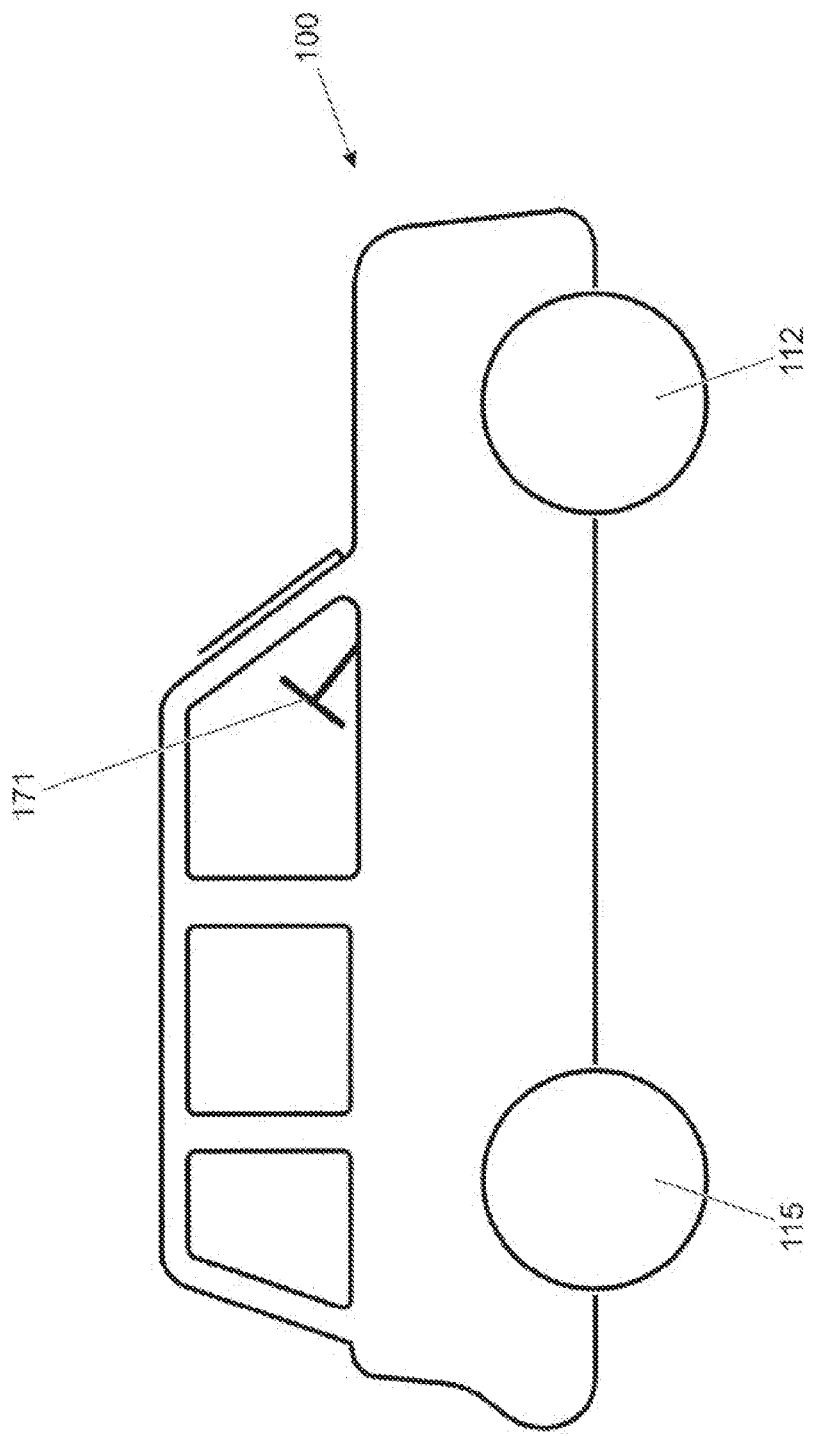
FIG. 2 shows the vehicle of FIG. 1 in side view.

FIG. 1 shows a vehicle 100 according to an embodiment of the present invention. The vehicle 100 has a powertrain 129 that includes an engine 121 that is connected to a driveline 130 having an automatic transmission 124. It is to be understood that embodiments of the present invention are also suitable for use in vehicles with manual transmissions, continuously variable transmissions or any other suitable transmission.

In the embodiment of FIG. 1 the transmission 124 may be set to one of a plurality of transmission operating modes, being a park mode, a reverse mode, a neutral mode, a drive mode or a sport mode, by means of a transmission mode selector dial 124S. The selector dial 124S provides an output signal to a powertrain controller 11 in response to which the powertrain controller 11 causes the transmission 124 to operate in accordance with the selected transmission mode.

The driveline 130 is arranged to drive a pair of front vehicle wheels 111,112 by means of a front differential 137 and a pair of front drive shafts 118. The driveline 130 also comprises an auxiliary driveline portion 131 arranged to drive a pair of rear wheels 114, 115 by means of an auxiliary driveshaft or prop-shaft 132, a rear differential 135 and a pair of rear driveshafts 139.

Embodiments of the invention are suitable for use with vehicles in which the transmission is arranged to drive only a pair of front wheels or only a pair of rear wheels (i.e. front wheel drive vehicles or rear wheel drive vehicles) or selectable two wheel drive/four wheel drive vehicles. In the embodiment of FIG. 1 the transmission 124 is releasably connectable to the auxiliary driveline portion 131 by means of a power transfer unit (PTU) 131P, allowing operation in a two wheel drive mode or a four wheel drive mode. It is to be understood that embodiments of the invention may be suitable for vehicles having more than four wheels or where only two wheels are driven, for example two wheels of a three wheeled vehicle or four wheeled vehicle or a vehicle with more than four wheels.

Figure 3:
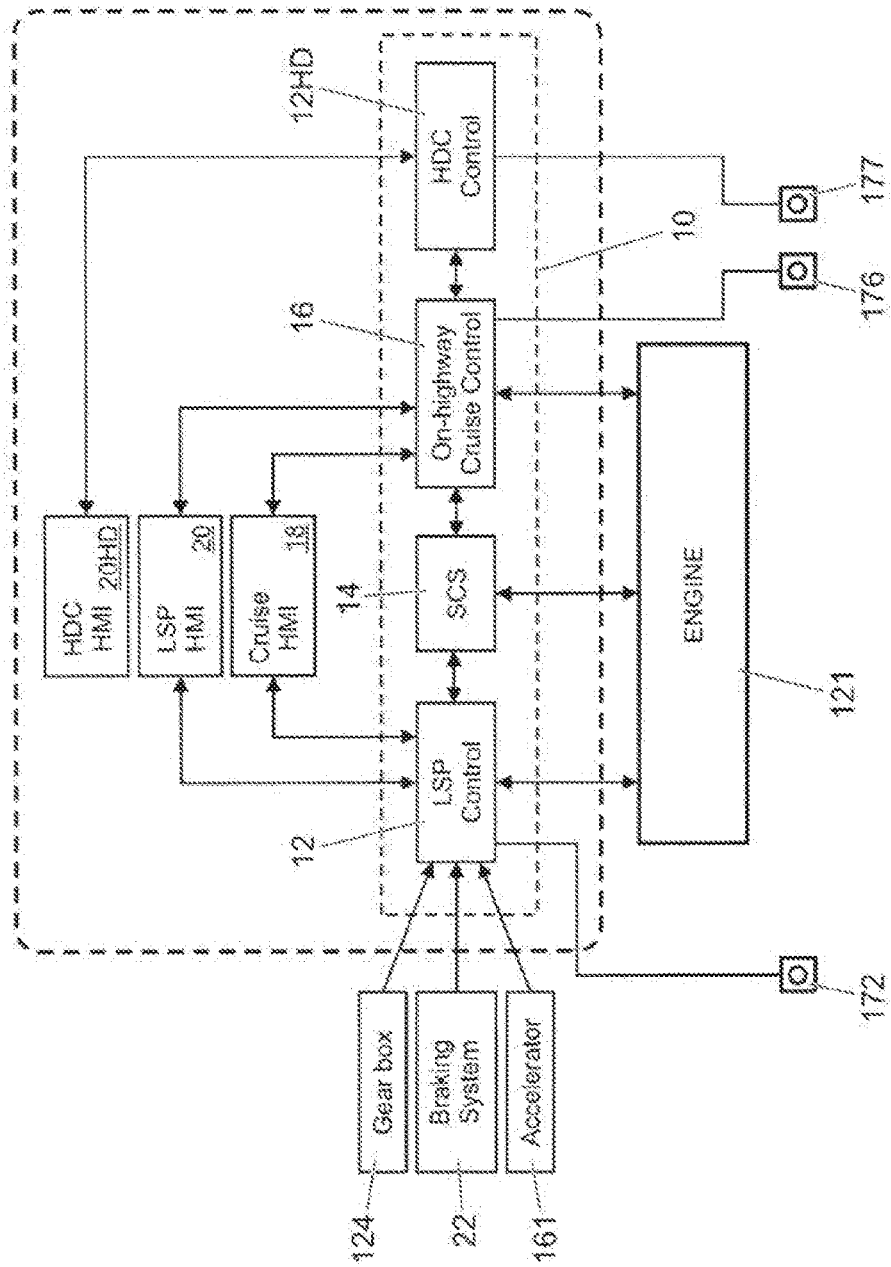
FIG. 3 is a high level schematic diagram of an embodiment of the vehicle speed control system of the present invention, including a cruise control system and a low-speed progress control system.

A control system for the vehicle engine 121 includes a central controller 10, referred to as a vehicle control unit (VCU) 10, the powertrain controller 11, a brake controller 13 and a steering controller 170C. The brake controller 13 forms part of a braking system 22 (FIG. 3). The VCU 10 receives and outputs a plurality of signals to and from various sensors and subsystems (not shown) provided on the vehicle. The VCU 10 includes a low-speed progress (LSP) control system 12 shown in FIG. 3 and a stability control system (SCS) 14. The SCS 14 improves the safety of the vehicle 100 by detecting and managing loss of traction. When a reduction in traction or steering control is detected, the SCS 14 is operable automatically to command a brake controller 13 to apply one or more brakes of the vehicle to help to steer the vehicle 100 in the direction the user wishes to travel. In the embodiment shown the SCS 14 is implemented by the VCU 10. In some alternative embodiments the SCS 14 may be implemented by the brake controller 13. Further alternatively, the SCS 14 may be implemented by a separate controller.

Although not shown in detail in FIG. 3, the VCU 10 further includes a Dynamic Stability Control (DSC) function block, a Traction Control (TC) function block, an Anti-Lock Braking System (ABS) function block and a Hill Descent Control (HDC) function block. These function blocks are implemented in software code run by a computing device of the VCU 10 and provide outputs indicative of, for example, DSC activity, TC activity, ABS activity, brake interventions on individual wheels and engine torque requests from the VCU 10 to the engine 121 in the event a wheel slip event occurs. Each of the aforementioned events indicate that a wheel slip event has occurred. Other vehicle sub-systems such as a roll stability control system or the like may also be useful.

Figure 5:
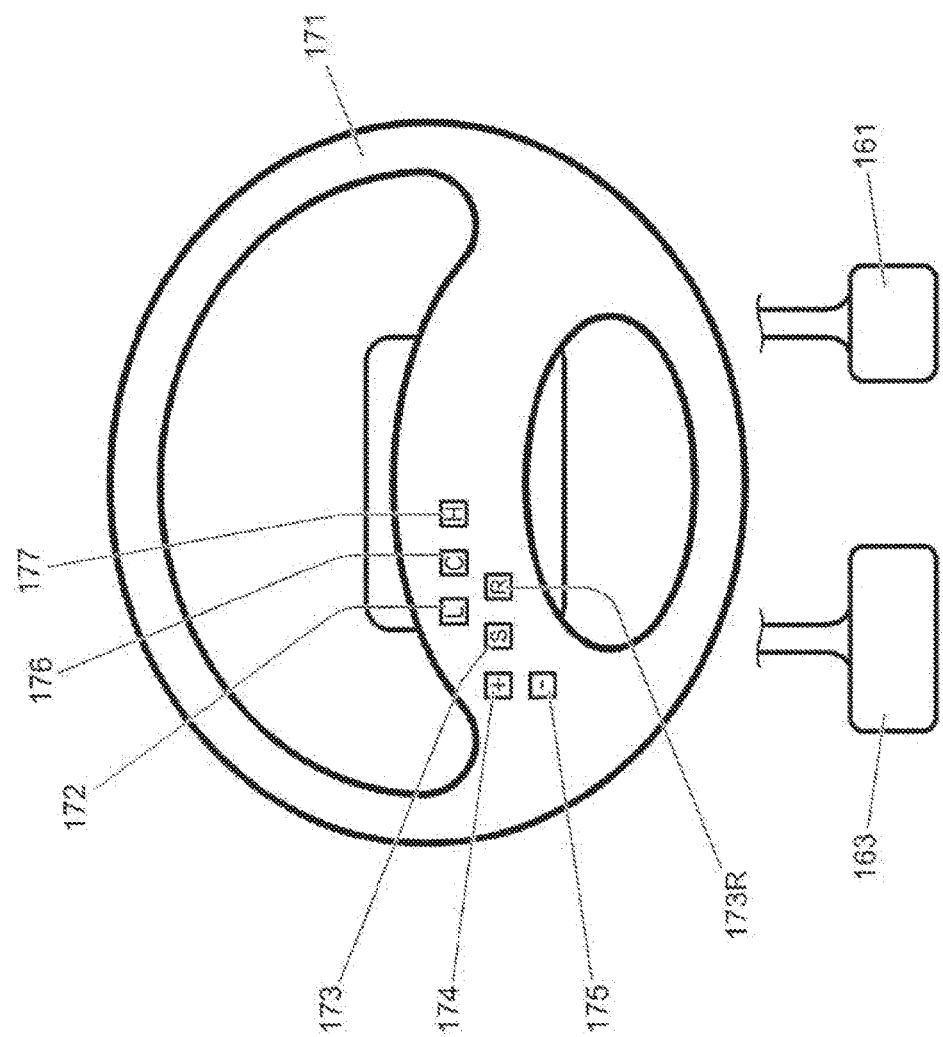
FIG. 5 illustrates a steering wheel and brake and accelerator pedals of a vehicle according to an embodiment of the present invention.

As noted above the vehicle 100 also includes a cruise control system 16 which is operable to automatically maintain vehicle speed at a selected speed when the vehicle is travelling at speeds in excess of 25 kph. The cruise control system 16 is provided with a cruise control HMI (human machine interface) 18 by which means the user can input a target vehicle speed to the cruise control system 16 in a known manner. In one embodiment of the invention, cruise control system input controls are mounted to a steering wheel 171 (FIG. 5). The cruise control system 16 may be switched on by pressing a cruise control system selector button 176. When the cruise control system 16 is switched on, depression of a 'set-speed' control 173 sets the current value of a cruise control set-speed parameter, cruise_set-speed to the current vehicle speed. Depression of a '+' button 174 allows the value of cruise_set-speed to be increased whilst depression of a '−' button 175 allows the value of cruise_set-speed to be decreased. A resume button 173R is provided that is operable to control the cruise control system 16 to resume speed control at the instant value of cruise_set-speed following driver over-ride. It is to be understood that known on-highway cruise control systems including the present system 16 are configured so that, in the event that the user depresses the brake or, in the case of vehicles with a manual transmission, a clutch pedal, the cruise control function is cancelled and the vehicle 100 reverts to a manual mode of operation which requires accelerator pedal input by a user in order to maintain vehicle speed. In addition, detection of a wheel slip event, as may be initiated by a loss of traction, also has the effect of cancelling the cruise control function. Speed control by the system 16 is resumed if the driver subsequently depresses the resume button 173R.

The cruise control system 16 monitors vehicle speed and any deviation from the target vehicle speed is adjusted automatically so that the vehicle speed is maintained at a substantially constant value, typically in excess of 25 kph. In other words, the cruise control system is ineffective at speeds lower than 25 kph. The cruise control HMI 18 may also be configured to provide an alert to the user about the status of the cruise control system 16 via a visual display of the HMI 18. In the present embodiment the cruise control system 16 is configured to allow the value of cruise_set-speed to be set to any value in the range 25-150 kph.

The LSP control system 12 also provides a speed-based control system for the user which enables the user to select a very low target speed at which the vehicle can progress without any pedal inputs being required by the user. Low-speed speed control (or progress control) functionality is not provided by the on-highway cruise control system 16 which operates only at speeds above 25 kph.

The LSP control system 12 is activated by means of a LSP control system selector button 172 mounted on the steering wheel 171. The system 12 is operable to apply selective powertrain, traction control and braking actions to one or more wheels of the vehicle 100, collectively or individually, to maintain the vehicle 100 at the desired speed.

The LSP control system 12 is configured to allow a user to input a desired value of set-speed parameter, user_set-speed to the LSP control system 12 via a low-speed progress control HMI (LSP HMI) 20 (FIG. 1, FIG. 3) which shares certain input buttons 173-175 with the cruise control system 16 and HDC control system 12HD. Provided the vehicle speed is within the allowable range of operation of the LSP control system (which is the range from 2 to 30 kph in the present embodiment although other ranges are also useful) and no other constraint on vehicle speed exists whilst under the control of the LSP control system 12, the LSP control system 12 controls vehicle speed in accordance with a LSP control system set-speed value LSP_set-speed which is set substantially equal to user_set-speed. Unlike the cruise control system 16, the LSP control system 12 is configured to operate independently of the occurrence of a traction event. That is, the LSP control system 12 does not cancel speed control upon detection of wheel slip. Rather, the LSP control system 12 actively manages vehicle behaviour when slip is detected.

The LSP control HMI 20 is provided in the vehicle cabin so as to be readily accessible to the user. The user of the vehicle 100 is able to input to the LSP control system 12, via the LSP HMI 20, an indication of the speed at which the user desires the vehicle to travel (referred to as "the target speed") by means of the 'set-speed' button 173 and the '+'/'−' buttons 174, 175 in a similar manner to the cruise control system 16. The LSP HMI 20 also includes a visual display upon which information and guidance can be provided to the user about the status of the LSP control system 12.

The LSP control system 12 receives an input from the braking system 22 of the vehicle indicative of the extent to which the user has applied braking by means of the brake pedal 163. The LSP control system 12 also receives an input from an accelerator pedal 161 indicative of the extent to which the user has depressed the accelerator pedal 161. An input is also provided to the LSP control system 12 from the transmission or gearbox 124. This input may include signals representative of, for example, the speed of an output shaft of the gearbox 124, torque converter slip and a gear ratio request. Other inputs to the LSP control system 12 include an input from the cruise control HMI 18 which is representative of the status (ON/OFF) of the cruise control system 16, and an input from the LSP control HMI 20.

The HDC function block of the VCU 10 forms part of a HDC system 12HD. When the HDC system 12HD is active, the system 12HD controls the braking system 22 (of which the ABS function block forms part) in order to limit vehicle speed to a value corresponding to that of a HDC set-speed parameter HDC_set-speed which may be set by a user. The HDC set-speed may also be referred to as an HDC target speed. Provided the user does not override the HDC system by depressing the accelerator pedal when the HDC system is active, the HDC system 12HD controls the braking system 22 (FIG. 3) to prevent vehicle speed from exceeding the HDC_set-speed. In the present embodiment the HDC system 12HD is not operable to apply positive drive torque. Rather, the HDC system 12HD is only operable to apply negative brake torque.

A HDC system HMI 20HD is provided by means of which a user may control the HDC system 12HD, including setting the value of HDC_set-speed. An HDC system selector button 177 is provided on the steering wheel 171 by means of which a user may activate the HDC system 12HD to control vehicle speed.

As noted above, the HDC system 12HD is operable to allow a user to set a value of HDC set-speed parameter HDC_set-speed and to adjust the value of HDC_set-speed using the same controls as the cruise control system 16 and LSP control system 12. Thus, in the present embodiment, when the HDC system 12HD is controlling vehicle speed, the HDC system set-speed may be increased, decreased or set to an instant speed of the vehicle in a similar manner to the set-speed of the cruise control system 16 and LSP control system, using the same control buttons 173, 173R, 174, 175. The HDC system 12HD is operable to allow the value of HDC_set-speed to be set to any value in the range from 2-30 kph.

If the HDC system 12HD is selected when the vehicle 100 is travelling at a speed of 50 kph or less and no other speed control system is in operation, the HDC system 12HD sets the value of HDC_set-speed to a value selected from a look-up table. The value output by the look-up table is determined in dependence on the identity of the currently selected transmission gear, the currently selected PTU gear ratio (Hi/LO) and the currently selected driving mode. The HDC system 12HD then applies the powertrain 129 and/or braking system 22 to slow the vehicle 100 to the HDC system set-speed provided the driver does not override the HDC system 12HD by depressing the accelerator pedal 161. The HDC system 12HD is configured to slow the vehicle 100 to the set-speed value at a deceleration rate not exceeding a maximum allowable rate. The rate is set as 1.25 ms-2 in the present embodiment, however other values are also useful. If the user subsequently presses the 'set-speed' button 173 the HDC system 12HD sets the value of HDC_set-speed to the instant vehicle speed provided the instant speed is 30 kph or less. If the HDC system 12HD is selected when the vehicle 100 is travelling at a speed exceeding 50 kph, the HDC system 12HD ignores the request and provides an indication to the user that the request has been ignored.

It is to be understood that the VCU 10 is configured to implement a known Terrain Response (TR) (RTM) System of the kind described above in which the VCU 10 controls settings of one or more vehicle systems or sub-systems such as the powertrain controller 11 in dependence on a selected driving mode. The driving mode may be selected by a user by means of a driving mode selector 141S (FIG. 1). The driving modes may also be referred to as terrain modes, terrain response modes, or control modes. In the embodiment of FIG. 1 four driving modes are provided: an 'on-highway' driving mode suitable for driving on a relatively hard, smooth driving surface where a relatively high surface coefficient of friction exists between the driving surface and wheels of the vehicle; a 'sand' driving mode suitable for driving over sandy terrain; a 'grass, gravel or snow' (GGS) driving mode suitable for driving over grass, gravel or snow, a 'rock crawl' (RC) driving mode suitable for driving slowly over a rocky surface; and a 'mud and ruts' (MR) driving mode suitable for driving in muddy, rutted terrain. Other driving modes may be provided in addition or instead.

In some embodiments, the LSP control system 12 may be in either one of an active condition, a standby condition and an 'off' condition. In the active condition, the LSP control system 12 actively manages vehicle speed by controlling powertrain torque and braking system torque. In the standby condition, the LSP control system 12 does not control vehicle speed until a user presses the resume button 173R or the 'set speed' button 173. In the off condition the LSP control system 12 is not responsive to input controls until the LSP control system selector button 172 is depressed.

In the present embodiment the LSP control system 12 is also operable to assume an intermediate condition similar to that of the active mode but in which the LSP control system 12 is prevented from commanding the application of positive drive torque to one or more wheels of the vehicle 100 by the powertrain 129. Thus, only braking torque may be applied, by means of the braking system 22 and/or powertrain 129. Other arrangements are also useful.

With the LSP control system 12 in the active condition, the user may increase or decrease the vehicle set-speed by means of the '+' and '−' buttons 174, 175. In addition, the user may also increase or decrease the vehicle set-speed by lightly pressing the accelerator or brake pedals 161, 163 respectively. In some embodiments, with the LSP control system 12 in the active condition the '+' and '−' buttons 174, 175 are disabled such that adjustment of the value of LSP_set-speed can only be made by means of the accelerator and brake pedals 161, 163. This latter feature may prevent unintentional changes in set-speed from occurring, for example due to accidental pressing of one of the '+' or '−' buttons 174, 175. Accidental pressing may occur for example when negotiating difficult terrain where relatively large and frequent changes in steering angle may be required. Other arrangements are also useful.

It is to be understood that in the present embodiment the LSP control system 12 is operable to cause the vehicle to travel in accordance with a value of set-speed in the range from 2-30 kph whilst the cruise control system is operable to cause the vehicle to travel in accordance with a value of set-speed in the range from 25-150 kph although other values are also useful. If the LSP control system 12 is selected when the vehicle speed is above 30 kph but less than or substantially equal to 50 kph, the LSP control system 12 assumes the intermediate mode. In the intermediate mode, if the driver releases the accelerator pedal 161 whilst travelling above 30 kph the LSP control system 12 deploys the braking system 22 to slow the vehicle 100 to a value of set-speed corresponding to the value of parameter LSP_set-speed. Once the vehicle speed falls to 30 kph or below, the LSP control system 12 assumes the active condition in which it is operable to apply positive drive torque via the powertrain 129, as well as brake torque via the powertrain 129 (via engine braking) and the braking system 22 in order to control the vehicle in accordance with the LSP_set-speed value. If no LSP set-speed value has been set, the LSP control system 12 assumes the standby mode.

It is to be understood that if the LSP control system 12 is in the active mode, operation of the cruise control system 16 is inhibited. The two systems 12, 16 therefore operate independently of one another, so that only one can be operable at any one time, depending on the speed at which the vehicle is travelling.

In some embodiments, the cruise control HMI 18 and the LSP control HMI 20 may be configured within the same hardware so that, for example, the speed selection is input via the same hardware, with one or more separate switches being provided to switch between the LSP input and the cruise control input.

Figure 4:
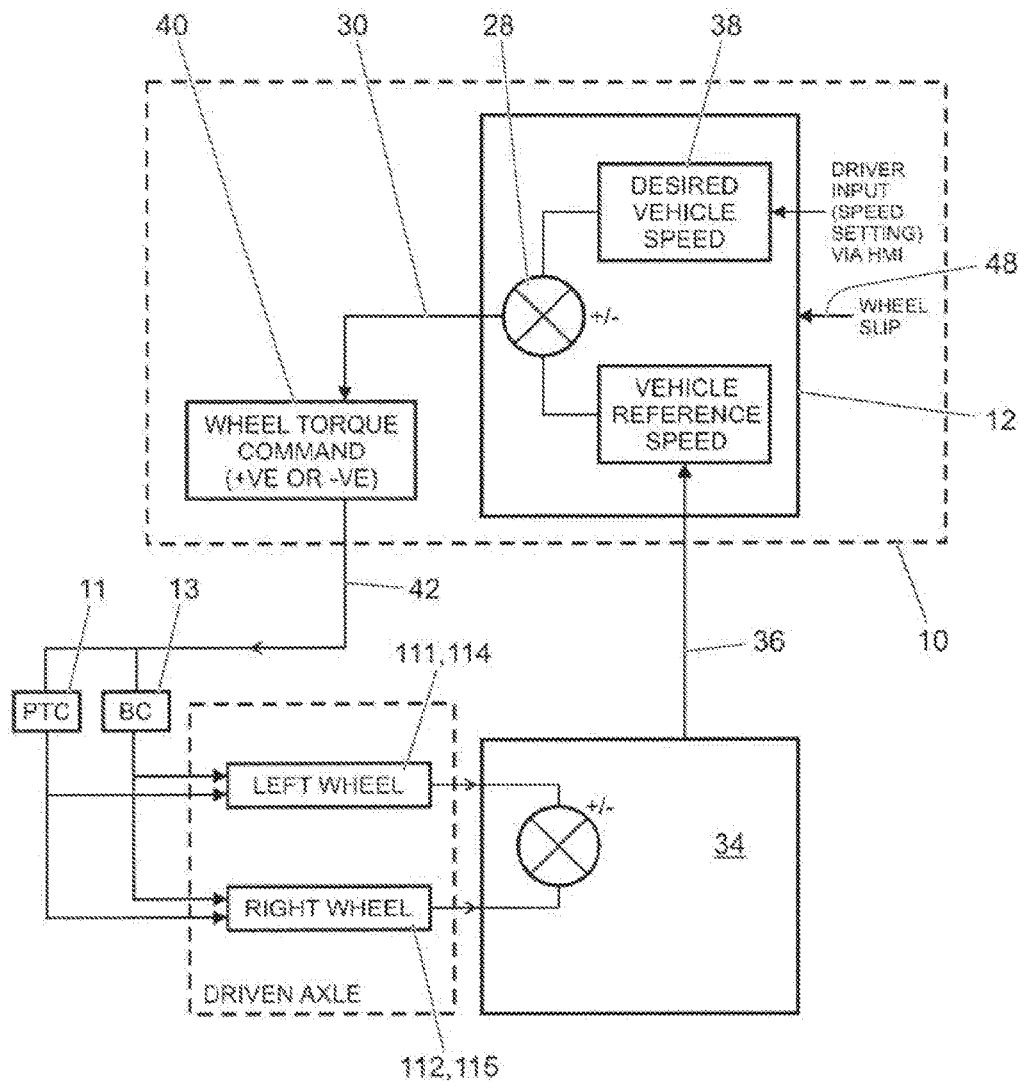
FIG. 4 is a schematic diagram of further features of the vehicle speed control system in FIG. 3.

FIG. 4 illustrates the means by which vehicle speed is controlled in the LSP control system 12. As described above, a speed selected by a user (user_set-speed) is input to the LSP control system 12 via the LSP control HMI 20. The LSP control system 12 determines whether this speed is appropriate for the prevailing terrain (as described in further detail below) and determines a required value of vehicle speed, LSP_set-speed, at which the vehicle is to operate. This speed is input to function block 38 of FIG. 4. A vehicle speed sensor 34 associated with the powertrain 129 (shown in FIG. 1) provides a signal 36 indicative of vehicle speed to the LSP control system 12. The LSP control system 12 includes a comparator 28 which compares the LSP_set-speed 38 (also referred to as a 'target speed' 38) with the measured speed 36 and provides an output signal 30 indicative of the comparison. The output signal 30 is provided to an evaluator unit 40 of the VCU 10 which interprets the output signal 30 as either a demand for additional torque to be applied to the vehicle wheels 111-115, or for a reduction in torque applied to the vehicle wheels 111-115, depending on whether the vehicle speed needs to be increased or decreased to maintain the speed LSP_set-speed. An increase in torque is generally accomplished by increasing the amount of powertrain torque delivered to a given position of the powertrain, for example an engine output shaft, a wheel or any other suitable location. A decrease in torque at a given wheel to a value that is less positive or more negative may be accomplished by decreasing powertrain torque delivered to a wheel and/or by increasing a braking force on a wheel. It is to be understood that in some embodiments in which a powertrain 129 has one or more electric machines operable as a generator, negative torque may be applied by the powertrain 129 to one or more wheels by the electric machine. Negative torque may also be applied by means of engine braking in some circumstances, depending at least in part on the speed at which the vehicle 100 is moving. If one or more electric machines are provided that are operable as propulsion motors, positive drive torque may be applied by means of the one or more electric machines.

An output 42 from the evaluator unit 40 is provided to the powertrain controller 11 and brake controller 13 which in turn control a net torque applied to the vehicle wheels 111-115. The net torque may be increased or decreased depending on whether the evaluator unit 40 demands positive or negative torque. In order to cause application of the necessary positive or negative torque to the wheels, the evaluator unit 40 may command that positive or negative torque is applied to the vehicle wheels by the powertrain 129 and/or that a braking force is applied to the vehicle wheels by the braking system 22, either or both of which may be used to implement the change in torque that is necessary to attain and maintain a required vehicle speed. In the illustrated embodiment the torque is applied to the vehicle wheels individually so as to maintain the vehicle at the required speed, but in another embodiment torque may be applied to the wheels collectively to maintain the required speed. In some embodiments, the powertrain controller 11 may be operable to control an amount of torque applied to one or more wheels by controlling a driveline component such as a rear drive unit, front drive unit, differential or any other suitable component. For example, one or more components of the driveline 130 may include one or more clutches operable to allow an amount of torque applied to one or more wheels to be varied. Other arrangements are also useful.

Where a powertrain 129 includes one or more electric machines, for example one or more propulsion motors and/or generators, the powertrain controller 11 may be operable to modulate torque applied to one or more wheels by means of one or more electric machines.

The LSP control system 12 also receives a signal 48 indicative of a wheel slip event having occurred. This may be the same signal 48 that is supplied to the on-highway cruise control system 16 of the vehicle, and which in the case of the latter triggers an override or inhibit mode of operation in the on-highway cruise control system 16 so that automatic control of vehicle speed by the on-highway cruise control system 16 is suspended or cancelled. However, the LSP control system 12 is not arranged to cancel or suspend operation in dependence on receipt of a wheel slip signal 48 indicative of wheel slip. Rather, the system 12 is arranged to monitor and subsequently manage wheel slip so as to reduce driver workload. During a slip event, the LSP control system 12 continues to compare the measured vehicle speed with the value of LSP_set-speed, and continues to control automatically the torque applied to the vehicle wheels so as to maintain vehicle speed at the selected value. It is to be understood therefore that the LSP control system 12 is configured differently to the cruise control system 16, for which a wheel slip event has the effect of overriding the cruise control function so that manual operation of the vehicle must be resumed, or speed control by the cruise control system 12 resumed by pressing the resume button 173R or set-speed button 173.

In a further embodiment of the present invention (not shown) a wheel slip signal 48 is derived not just from a comparison of wheel speeds, but further refined using sensor data indicative of the vehicle's speed over ground. Such a speed over ground determination may be made via global positioning (GPS) data, or via a vehicle mounted radar or laser based system arranged to determine the relative movement of the vehicle 100 and the ground over which it is travelling. A camera system may be employed for determining speed over ground in some embodiments.

At any stage of the LSP control process the user can override the function by depressing the accelerator pedal 161 and/or brake pedal 163 to adjust the vehicle speed in a positive or negative sense. However, in the event that a wheel slip event is detected via signal 48, the LSP control system 12 remains active and control of vehicle speed by the LSP control system 12 is not suspended. As shown in FIG. 4, this may be implemented by providing a wheel slip event signal 48 to the LSP control system 12 which is then managed by the LSP control system 12. In the embodiment shown in FIG. 1 the SCS 14 generates the wheel slip event signal 48 and supplies it to the LSP control system 12 and cruise control system 16.

A wheel slip event is triggered when a loss of traction occurs at any one of the vehicle wheels. Wheels and tyres may be more prone to losing traction when travelling for example on snow, ice, mud or sand and/or on steep gradients or cross-slopes. A vehicle 100 may also be more prone to losing traction in environments where the terrain is more uneven or slippery compared with driving on a highway in normal on-road conditions. Embodiments of the present invention therefore find particular benefit when the vehicle 100 is being driven in an off-road environment, or in conditions in which wheel slip may commonly occur. Manual operation in such conditions can be a difficult and often stressful experience for the driver and may result in an uncomfortable ride.

The vehicle 100 is also provided with additional sensors (not shown) which are representative of a variety of different parameters associated with vehicle motion and status. These may be inertial systems unique to the LSP or HDC control system 12, 12HD or part of an occupant restraint system or any other sub-system which may provide data from sensors such as gyros and/or accelerometers that may be indicative of vehicle body movement and may provide a useful input to the LSP and/or HDC control systems 12, 12HD. The signals from the sensors provide, or are used to calculate, a plurality of driving condition indicators (also referred to as terrain indicators) which are indicative of the nature of the terrain conditions over which the vehicle is travelling.

The sensors (not shown) on the vehicle 100 include, but are not limited to, sensors which provide continuous sensor outputs to the VCU 10, including wheel speed sensors, as mentioned previously and as shown in FIG. 5, an ambient temperature sensor, an atmospheric pressure sensor, tyre pressure sensors, wheel articulation sensors, gyroscopic sensors to detect vehicular yaw, roll and pitch angle and rate, a vehicle speed sensor, a longitudinal acceleration sensor, an engine torque sensor (or engine torque estimator), a steering angle sensor, a steering wheel speed sensor, a gradient sensor (or gradient estimator), a lateral acceleration sensor which may be part of the SCS 14, a brake pedal position sensor, a brake pressure sensor, an accelerator pedal position sensor, longitudinal, lateral and vertical motion sensors, and water detection sensors forming part of a vehicle wading assistance system (not shown). In other embodiments, only a selection of the aforementioned sensors may be used.

The VCU 10 also receives a signal from the steering controller 170C. The steering controller 170C is in the form of an electronic power assisted steering unit (ePAS unit). The steering controller 170C provides a signal to the VCU 10 indicative of the steering force being applied to steerable road wheels 111, 112 of the vehicle 100. This force corresponds to that applied by a user to the steering wheel 171 in combination with steering force generated by the ePAS unit 170C.

The VCU 10 evaluates the various sensor inputs to determine the probability that each of a plurality of different control modes (driving modes) for the vehicle subsystems is appropriate, with each control mode corresponding to a particular terrain type over which the vehicle is travelling (for example, mud and ruts, sand, grass/gravel/snow).

If the user has selected operation of the vehicle in an automatic driving mode selection condition, the VCU 10 then selects the most appropriate one of the control modes and is configured automatically to control the subsystems according to the selected mode. This aspect of the invention is described in further detail in our co-pending patent application nos. GB1111288.5, GB1211910.3 and GB1202427.9, the contents of each of which is incorporated herein by reference.

As indicated above, the nature of the terrain over which the vehicle is travelling (as determined by reference to the selected control mode) may also be utilised in the LSP control system 12 to determine an appropriate increase or decrease in vehicle speed. For example, if the user selects a value of user_set-speed that is not suitable for the nature of the terrain over which the vehicle is travelling, the system 12 is operable to automatically adjust the vehicle speed downwards by reducing the speed of the vehicle wheels. In some cases, for example, the user selected speed may not be achievable or appropriate over certain terrain types, particularly in the case of uneven or rough surfaces. If the system 12 selects a set-speed (a value of LSP_set-speed) that differs from the user-selected set-speed user_set-speed, a visual indication of the speed constraint is provided to the user via the LSP HMI 20 to indicate that an alternative speed has been adopted.

The LSP control system 12 determines the value of LSP_set-speed in dependence on the terrain over which the vehicle is travelling. Thus, the LSP control system 12 is operable to limit the maximum speed at which it will control a vehicle 10 to operate in dependence on the terrain. Embodiments of the invention allow improved vehicle composure when operating in off-highway conditions with reduced driver intervention. That is, because the LSP control system 12 determines a maximum allowable value of LSP_set-speed and limits the speed of the vehicle 100 accordingly, a driver is not required to intervene in order to reduce the value of user_set-speed when the prevailing terrain so warrants, and to increase the value of user_set-speed when the prevailing terrain allows. In the present embodiment the LSP control system 12 is only operable to calculate a value of LSP_set-speed if the LSP speed control function is active, as opposed to an on-highway cruise control system. It will be appreciated however, that the approach described herein, of adjusting the vehicle speed automatically in dependence on variation of the prevailing surface or terrain over which the vehicle is travelling, in order to maintain occupant comfort and vehicle composure, may also be incorporated into a vehicle speed control system optimised for on-highway driving.

In the present embodiment, the LSP control system 12 is configured to generate the value of LSP_set-speed in dependence on a number of parameters associated with the vehicle. The LSP control system 12 causes the vehicle to operate in accordance with the lowest of six values of vehicle target speed, that is the LSP control system 12 sets the value of LSP_set-speed to the lowest of six values of target speed. The target speed values are (a) user_set-speed; (b) a maximum vehicle speed Psng_Excit_v calculated in dependence on the value of an occupant excitation parameter Psng_Excit, the value of Psng_Excit being set in dependence on vehicle pitch acceleration, roll acceleration and heave acceleration; (c) a maximum speed steering_angle_v that is set in dependence on steering angle and vehicle speed; (d) a maximum speed sideslope_v that is set in dependence on a value of surface side slope; (e) a maximum speed grad_v that is set in dependence on surface gradient; and (f) a maximum speed warp_v or warp speed that is set in dependence on vehicle suspension articulation, also referred to as suspension warp. Optionally, the inputs may include a maximum speed value that is set in dependence on whether the vehicle is wading. In some embodiments this maximum speed value may be set in dependence at least in part on a depth of liquid (such as water) through which the vehicle is wading. Other parameters and speeds are also useful.

The LSP control system 12 is configured to receive inputs corresponding to a number of vehicle parameters. The parameters include: (a) a current vehicle reference value of surface coefficient of friction, being a value calculated based on values of one or more parameters such as an amount of torque applied to a wheel at which excessive wheel slip was induced; (b) a value of expected surface coefficient of friction corresponding to a currently selected vehicle driving mode, being a prescribed value for each driving mode; (c) a current value of steering angle, corresponding to a steerable road wheel angle or steering wheel position; (d) a current yaw rate of the vehicle (determined by reference to an output of an accelerometer); (e) a current measured value of lateral acceleration (also determined by reference to an output of an accelerometer); (f) a current measured value of surface roughness (determined by reference to suspension articulation); (g) a current location of the vehicle (determined by reference to a global satellite positioning system (GPS) output); and (h) information obtained by means of a camera system. The preceding list is intended to be illustrative of an example only and is not intended to be limiting, other inputs also being useful in addition or instead.

The information obtained by means of a camera system may include for example an alert in the event that it is determined that the vehicle 10 may be about to depart from an off-road lane or track. In some embodiments, one or more systems of the vehicle 100, optionally the LSP control system 12, may be configured to detect terrain ahead of the vehicle that may affect the value of Psng_Excit. That is, the LSP control system 12 may predict that occupant excitation may be adversely or positively affected by terrain ahead of the vehicle based on analysis of one or more images of terrain in a path of the vehicle. Thus the LSP control system 12 may be configured to change the value of Psng_Excit or otherwise affect vehicle speed in anticipation of a change in the value of Psng_Excit if the vehicle continues at its current rate of progress. This is in contrast to reactive evaluation of terrain by reference to the vehicle parameters discussed above.

It is to be understood that in some embodiments a controller or system other than the LSP control system 12 is configured to determine the value of Psng_Excit.

Figure 6:
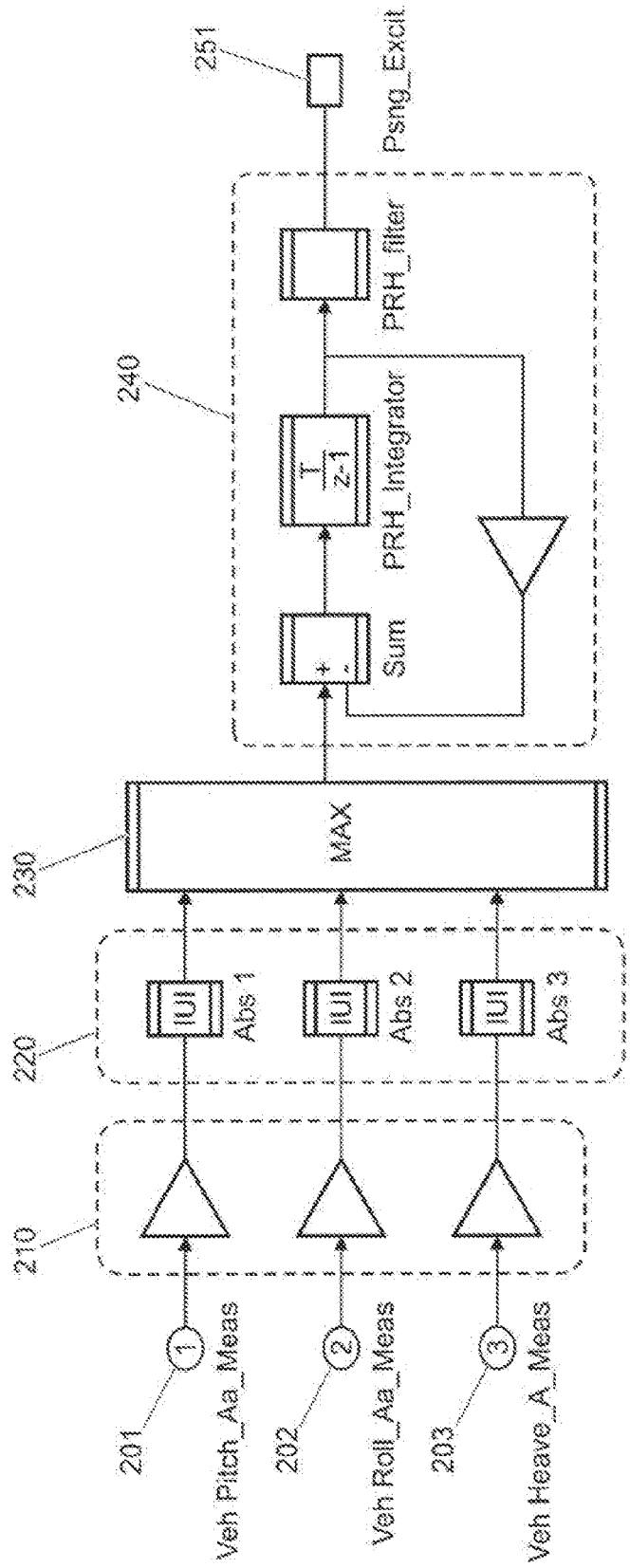
FIG. 6 is a schematic illustration of a control logic arrangement for generating a value of an occupant excitation parameter Psng_Excit in dependence on values of vehicle pitch acceleration, vehicle roll acceleration and vehicle heave acceleration.

FIG. 6 illustrates a manner in which the LSP control system 12 determines the value of Psng_Excit. The LSP control system 12 receives a value of each of three parameters in order to calculate a value of Psng_Excit: (1) VehPitch_Aa_Meas, being a measured value of vehicle body pitch angular acceleration; (2) VehRoll_Aa_Meas, being a measured value of vehicle body roll angular acceleration; and (3) VehHeave_A_Meas being a measured value of vehicle body heave acceleration. By vehicle body heave acceleration is meant acceleration of the vehicle body in a z-direction with respect to x, y, z axes where the z-direction corresponds to a vertically upward direction with respect to a vehicle frame of reference (this direction corresponding substantially to a vertically upward direction with respect to earth if the vehicle is stood on a substantially horizontal plane). The values are input to respective signal inputs 201, 202, 203 of the LSP control system 12. In some embodiments the values are read by the LSP control system 12 from a controller area network (CAN) bus (not shown) or other means by which vehicle electronic control units may communicate with one another.

The term vehicle body is well understood and typically refers to the body portion of a vehicle, typically comprising an occupant compartment or cabin and that is typically supported by a suspension system, where a suspension system is provided.

The signals are fed to a gain function block 210, implemented in computer program code by the LSP control system 12, which applies respective amounts of gain to each of the signals. The amounts by which each signal is amplified is set in dependence on a sensitivity of an occupant to the value of each signal. Thus in some embodiments the gains are set to account for the observation that a lower value of pitch acceleration VehPitch_Aa_Meas is perceived as less comfortable to a vehicle occupant than an equivalent value of heave acceleration VehHeave_A_Meas. Thus the value of gain applied to the signal VehPitch_Aa_Meas may be higher than that applied to the signal Veh Heave_A_Meas in some embodiments.

The signal values processed by the gain block 210 are subsequently fed to a normalisation function block 220 that normalises the values to generate a value of maximum allowable speed according to the value of each signal. The maximum allowable values of signal are fed to a maximiser function block 230 that outputs the larger of the signals input thereto. The function blocks 220 are 'absolute' function blocks, i.e. they output only positive values corresponding to signal magnitude. This ensures that all values are comparable and not negative in value.

The larger of the signals is thus fed through a smoothing arrangement 240 that applies a feedback loop and subsequently a Butterworth filter to the signal. The signal output by the smoothing arrangement 240 is the value of Psng_Excit. The smoothing arrangement essentially performs a moving average calculation function without being required to store historical data in respect of the value of the parameter output by the maximiser function block 230. The output of the smoothing arrangement 240 therefore builds up an averaged profile of terrain over which the vehicle has passed over a given time period and serves to smooth out the relatively erratic nature of the acceleration profiles to which the vehicle body is subject.

In the present embodiment, the value of Psng_Excit is arranged to increase with increasing vehicle body excitation. Since occupant excitation is directly related to vehicle body excitation, increasing values of Psng_Excit correspond to decreasing occupant comfort.

It is to be understood that each of the function blocks 210, 220, 230, 240 are implemented by the LSP control system 12 in computer program code. In some alternative embodiments the function blocks may be implemented in hardware rather than computer program code, for example by means of electronic amplifier circuits, filter circuits and so forth.

When building a system according to the present embodiment, the level of discomfort experienced by a vehicle occupant over a range of values of Psng_Excit is explored in order to identify a range of values of Psng_Excit that correspond to an optimum trade-off between occupant comfort and vehicle speed. Values of vehicle target acceleration tgt_accel are then determined for each value of Psng_Excit. The values of tgt_accel are values of acceleration that may be imposed on the vehicle 100 in order to attempt to maintain the value of Psng_Excit within the optimum range identified as an optimum trade-off between occupant comfort and vehicle speed.

Figure 7:
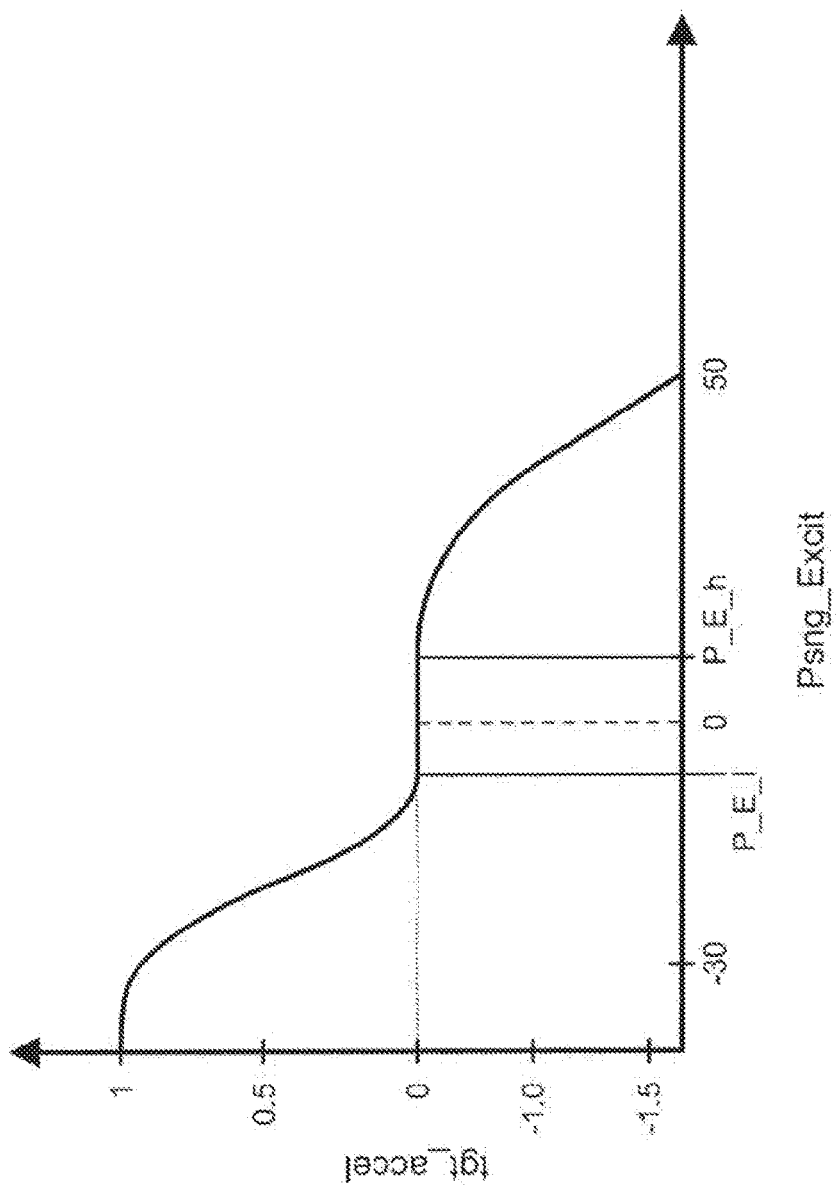
FIG. 7 is an illustration of data stored in a look up table in respect of vehicle target acceleration tgt_accel as a function of Psng_Excit.

The optimum range is shown in FIG. 4 as the range from a lower value P_E_I to a higher value P_E_high. The values of Psng_Excit shown in FIG. 7 are values normalised such that a value of Psng_Excit of zero is substantially midway between the upper and lower values P_E_I and P_E_h. Other arrangements are also useful.

In some alternative embodiments, the data is stored in the form of a difference or delta parameter. The LSP control system 12 determines a difference between the value of Psng_Excit determined in FIG. 6 and a pre-determined 'acceptable' value of Psng_Excit, and obtains from a database a corresponding value of tgt_accel.

In some embodiments, the value of Psng_Excit may be arranged to vary from zero (most comfortable) to a positive value such as 80, corresponding to an unacceptably high level of occupant excitation. Thus in some embodiments an acceptable value of Psng_Excit may be a value of around 30, or any other suitable value, typically determined empirically.

In the present embodiment, for values of Psng_Excit below P_E_I a value of vehicle acceleration tgt_accel is set as a function of Psng_Excit such that the value of tgt_accel becomes increasingly positive as the value of Psng_Excit decreases below P_E_I. Conversely, for values of Psng_Excit above P_E_h the value of Psng_Excit becomes increasingly negative as the value of Psng_Excit increases above P_E_h. Thus, for values of Psng_Excit below P_E_I, acceleration of the vehicle to a higher speed is favoured whilst for values of Psng_Excit above P_E_I, deceleration of the vehicle to a lower speed is favoured.

The LSP control system 12 is also configured to determine, with reference to a value of surface coefficient of friction between a wheel and driving surface, a maximum allowable rate of lateral acceleration max_lat_acc of the vehicle 10 during the course of a journey. The LSP control system 12 employs this value of max_lat_acc to generate the value of steering_angle_v so as to prevent understeer when the vehicle 10 is cornering. In the present embodiment the LSP control system 12 is also operable to calculate a radius of curvature of a path of the vehicle 100 over terrain based on steering angle. The LSP control system 12 compares this radius of curvature with a value determined by reference to a path of travel of the vehicle determined by reference to GPS location data. If the LSP control system 12 detects the presence of understeer the LSP control system 12 is operable to reduce the value of steering_angle_v accordingly. Yaw rate and measured lateral acceleration are also employed in the present embodiment in order to increase a reliability of the determination of the amount of understeer present, if any. In some embodiments, yaw rate and measured lateral acceleration are not employed in determining the amount of understeer present. Other arrangements are also useful.

The manner in which the LSP control system 12 determines the instant value of target speed LSP_set-speed will now be described with reference to FIG. 8. It is to be understood that each of the function blocks described is implemented in software code in the present embodiment, although in some alternative embodiments one or more of the function blocks may be implemented in the form of discrete electronic circuits.

Figure 8:
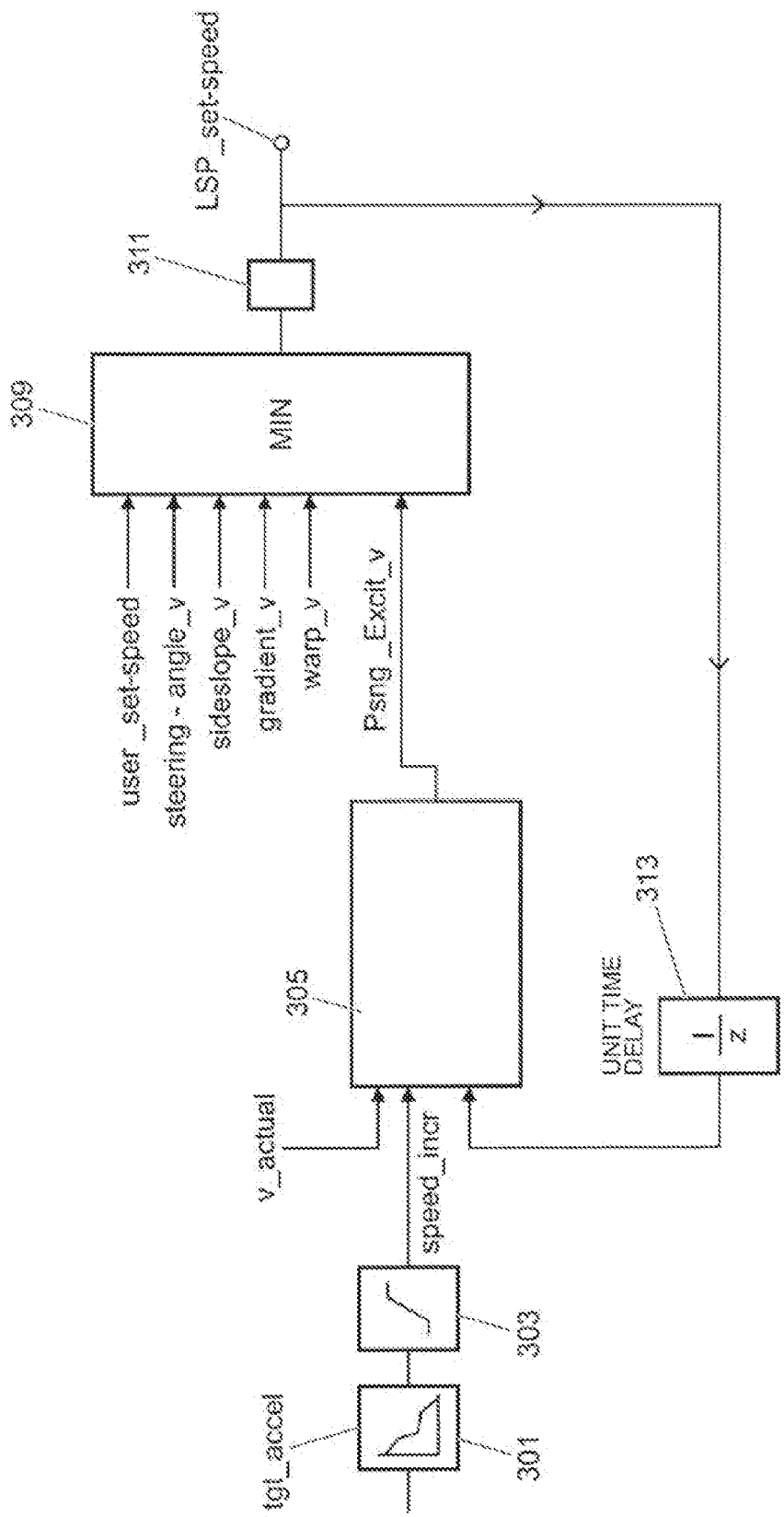
FIG. 8 is a schematic illustration showing an arrangement of signals for generating a value of a speed LSP_set-speed for a low speed control system according to an embodiment of the present invention.

As shown in FIG. 8, the values of each of the six speed parameters user_set-speed, Psng_Excit,_v, steering_angle_v, sideslope_v, gradient_v and warp_v are input to a minimiser function block 309. The minimiser function block 309 outputs therefrom the lower of the six speeds. This speed is fed to a rate limiting function block 311 which compares the speed value output by the minimiser function block 309 with an instant value of vehicle speed. The rate limiting function block 311 is configured to ensure that the difference between them does not correspond to a positive acceleration exceeding a prescribed value (1.5 ms-2 in the present embodiment) or a negative acceleration the magnitude of which exceeds a further prescribed value (1.25 ms-2 in the present embodiment).

The speed output by the rate limiting function block 311 is the value of LSP_v_target. The LSP control system 12 then controls vehicle speed in accordance with the value of LSP_set-speed.

The value of Psng_Excit_v is determined as follows.

The value of tgt_accel determined according to an instant value of Psng_Excit is obtained at function block 301 by reference to the look up table discussed above in respect of the data represented in FIG. 7. This value is fed to a rate limiting function block 303 that determines a corresponding amount by which the instant value of LSP_set-speed should be changed over the next time step of the LSP control system 12 in order to achieve a rate of acceleration (which may be positive or negative) corresponding to tgt_accel. This value is given by a variable labelled speed_delta in FIG. 8. The rate limiting function block 303 is configured to prevent the value of LSP_v_target increasing at a rate exceeding a maximum allowable rate. In some embodiments the maximum allowable rate may be around 1.5 ms-2 for positive vehicle acceleration and 1.25 ms-2 for negative acceleration, i.e. deceleration of the vehicle 10. The value of vehicle speed increment speed_incr is fed to summing function block 305.

It is to be understood that the length of time step may be any suitable value at which the LSP control system 12 operates, such as 10 ms, 100 ms or any other suitable value.

Summing function block 305 also receives as an input a value of LSP_set-speed at a timestep immediately prior to the timestep for which an updated value of LSP_set-speed is being determined. This value is provided by means of a timestep function block 313.

The summing function block 305 also receives as an input a value of instant vehicle speed v_actual which may be the signal 36 of FIG. 4. The summing function block 305 calculates a difference (error value) between the instant value of vehicle speed v_actual and LSP_set-speed, being the speed at which the LSP control system 12 is attempting to cause the vehicle 100 to travel. If the difference exceeds a prescribed amount, the summing function block 305 outputs the value of LSP_set-speed as the value of Psng_Excit_v. This is so as to allow the LSP control system 12 time to cause vehicle speed to change to a value closer to the value of LSP_set-speed before attempting to change LSP_set-speed in response to the value of Psng_Excit. It is to be understood that once the speed v_actual achieves a value close to LSP_set-speed, the value of Psng_Excit may be within the optimum range from P_E_I to P_E_h, and therefore no further change in LSP_set-speed in response to Psng_Excit may be required.

If the error value does not exceed the prescribed amount, the summing function block 305 adds the value of speed_delta to the value of LSP_set-speed and sets the value of Psng_Excit_v to this value.

It is to be understood that if the vehicle 10 is travelling over terrain and the value of user_set-speed is lower than each of the speeds steering_angle_v, sideslope_v, gradient_v, warp_v and Psng_Excit_v, the LSP control function continues to cause the vehicle 10 to operate in accordance with a value of LSP_set-speed set substantially equal to the value of user_set-speed. In the absence of excessive wheel slip and optionally one or more other conditions, the vehicle 10 will continue to travel at a speed substantially equal to user_set-speed. The driver is able to increase or decrease the value of user_set-speed in the manner described above. However, once the value of user_set-speed becomes equal to the lower of the other parameters input to the minimiser function block 309, the LSP control system 12 does not allow vehicle speed to increase further. If the value of the lower of the remaining parameters falls below user_set-speed, for example due to a change in terrain, the LSP control system 12 controls vehicle speed to reduce to the lower of the remaining parameters by setting the value of LSP_set-speed to the lower of the remaining parameters.

In some embodiments a parameter max_set_speed is set equal to the lower of each of the six parameters input to the minimiser function block 309. The value of max_set_speed is output as the value of LSP_set-speed. The value of max_set_speed therefore sets a ceiling on the vehicle speed at any given moment in time whilst vehicle speed control is being effected by the LSP control system 12.

If the value of max_set_speed subsequently rises, the LSP control system 12 allows vehicle speed to increase to or towards user_set-speed (if user_set-speed is greater than max_set_speed) provided the speed does not exceed max_set_speed.

In the present embodiment, if the LSP control system 12 causes the vehicle 100 to operate in accordance with a speed lower than user_set-speed and a higher speed subsequently becomes allowed, in some embodiments a suitable visual or audible indication may be made to the vehicle driver. In some embodiments, the LSP control system 12 is operable such that, should a higher speed become allowed, the speed of the vehicle is automatically increased to the higher speed.

In one embodiment, the LSP control system 12 is operable to detect when a vehicle 100 has reached the top of a slope and is beginning to assume a level attitude. This scenario may be referred to as 'cresting'. When the LSP control system 12 determines that the vehicle 100 is cresting, it may temporarily reduce the value of LSP_set-speed (optionally be reducing the value of max_set_speed in some embodiments). This feature has the advantage that it reduces (if necessary) the vehicle speed to a speed that allows time for a driver to gain familiarity with terrain ahead of the vehicle 100 which may have been obscured by the slope and/or a front portion of the vehicle 100 such as a bonnet or hood. This enhances driver enjoyment of the vehicle 100 and vehicle composure. It is to be understood that, in some embodiments, a further upper (or maximum) speed value cresting_v is input to the minimiser function block 309. The value of cresting_v may be set to a value appropriate to the prevailing conditions when cresting is detected. Cresting may be detected for example when vehicle pitch attitude moves from a pitch up attitude exceeding a prescribed value (such as a value exceeding 15 degrees) through an angle of more than (say) 5 degrees towards a level attitude within a prescribed distance. Alternatively the system may monitor rate of change of gradient towards a level attitude. A sustained drop of (say) an average of 3 degrees per second, over a prescribed period such as a period of 2-4 s, may be sufficient to trigger the detection of cresting.

In some embodiments the LSP control system 12 may trigger the detection of cresting when the gradient falls below a prescribed value, for example below a gradient of 10 degrees. A combination of two or more tests may be performed to confirm the detection of cresting, to reduce the chances of a false detection of cresting which may inconvenience a user by an unnecessary reduction in vehicle speed. It is to be understood that if the rate of change of gradient is too low, even though the vehicle may be cresting, the LSP control system 12 may not detect cresting in some embodiments. A reduction in speed may not be necessary in these circumstances since the driver may have adequate time to assess terrain ahead of the vehicle as it progresses.

If cresting is detected and an appropriate reduction in vehicle speed results, the speed reduction may be applied for a prescribed time period or distance travelled. Once this period has expired or the distance has been travelled, the LSP control system 12 may revert to monitoring for a cresting condition once again.

When the LSP control system 12 detects that the vehicle attitude is sufficiently level and has been so for the prescribed distance or period of time, it may increase automatically the value of cresting_v (and max_set_speed in some embodiments).

In an embodiment, the LSP control system 12 is operable to detect when a rate of change of vehicle attitude has fallen below a prescribed value, signifying the cresting condition. The LSP control system 12 may then begin to increase the value of cresting_v once the prescribed time period has expired or prescribed distance has been travelled. Alternatively the LSP control system 12 may be configured to ignore the value of cresting_v when cresting is not detected. The feature of the delay before cresting_v is increased (or ignored) may be particularly advantageous for example where a vehicle is traversing undulating terrain and, following cresting of a peak, the vehicle descends a slope. The LSP control system 12 may maintain a reduced value of cresting_v until the vehicle 100 is established on a descent of the slope, enhancing vehicle composure and driver confidence.

In some embodiments, the LSP control system 12 is configured to detect when a vehicle has reached the bottom of a slope by detecting an increase in vehicle pitch following a descent. The LSP control system 12 may be configured to reduce temporarily the value of cresting_v when it is detected that the vehicle has reached the bottom of a slope in order to allow a driver time to negotiate the change in gradient. This feature has the advantage that it may reduce a risk of damage to a vehicle due to contact between an underside of the vehicle and terrain when the vehicle 100 reaches the bottom of the slope. Other arrangements are also useful.

Embodiments of the present invention are useful in enhancing vehicle composure by reducing automatically a maximum allowable value of set-speed when a vehicle is operating with a speed control system operational. Driver workload is reduced accordingly, reducing driver fatigue. Vehicle composure may also be enhanced.

In some embodiments, a value of Psng_Excit is calculated when the vehicle is operating with an on-highway cruise control system 16 active, regardless of whether the vehicle is equipped with a LSP control system. A schematic illustration showing the operation of such a system corresponding to that of FIG. 8 is shown in FIG. 9, where like features are indicated with like reference signs incremented by 100.

The on-highway cruise control system 16 may be any known on-highway cruise control system. However, a maximum value of target speed in accordance with which the cruise control system causes the vehicle to operate, cruise_set-speed, may be calculated in a similar manner to that described above in respect of LSP_set-speed except that the inputs to the minimiser function block 409 may be user_set-speed when the cruise control system is active and Psng_Excit_v. The value of cruise_set-speed may therefore be set to the lower of user_set-speed and Psng_Excit_v. The value of Psng_Excit_v may be determined by appropriate calibration with respect to values of VehPitch_Aa_Meas, VehRoll_Aa_Meas and VehHeave_A_Meas as described above.

In some embodiments one or more other parameters may be input to the minimiser function block 309, 409. For example, In some embodiments, an additional input to the minimiser function block 309, 409 may be a value of a parameter trailing_v_tgt, corresponding to an upper value of allowable target speed for maintaining a suitable distance behind a lead vehicle when the vehicle 100 is following a lead vehicle travelling in the same direction as the vehicle 100 but at substantially the same or a lower speed. This may conveniently allow active cruise control functionality to be implemented in a convenient manner in some embodiments. Additionally or alternatively, the vehicle may be further provided with means for viewing or reading the road ahead, where those means are arranged to generate a signal indicative of the prevailing road speed limit. Where a road speed limit signal is available, this signal may also be input into the minimiser function block 309, 409. This may conveniently allow intelligent speed limiter speed control functionality to be implemented in a convenient manner in some embodiments.

Figure 9:
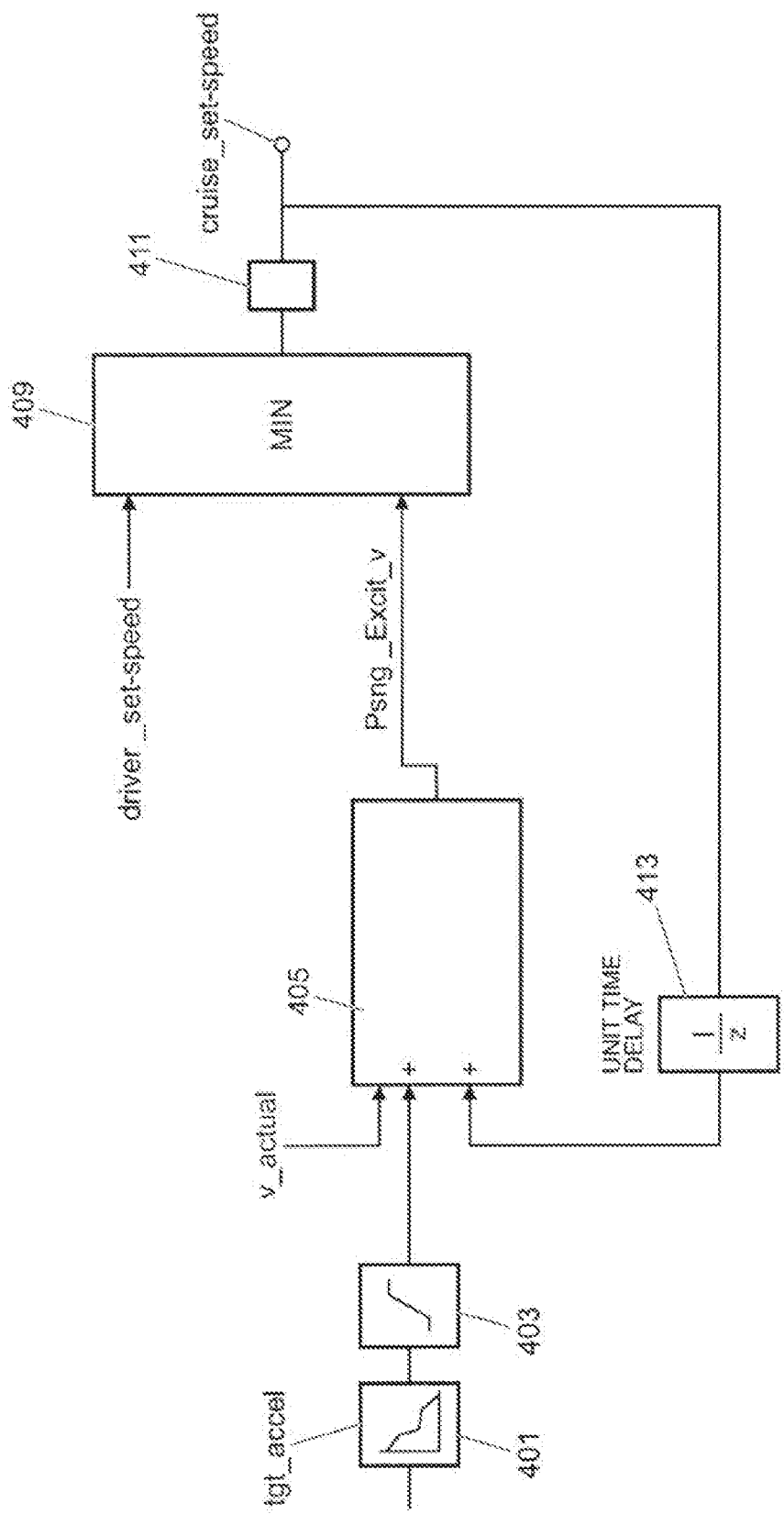
FIG. 9 is a schematic illustration showing an arrangement of signals for generating a value of a speed cruise_set-speed for a cruise control system according to an embodiment of the present invention.

Speed control systems according to embodiments of the present invention such as that illustrated in FIG. 9 have the advantage that occupant comfort may be maintained whilst a vehicle is being driven on-highway. A known cruise control system 16 may be employed in a vehicle according to an embodiment of the present invention, the system 16 being provided with a value of cruise_set-speed calculated as described with respect to FIG. 9. Thus existing cruise control system calibrations may be employed in some embodiments, reducing a cost of implementing some embodiments of the present invention. In some embodiments this may conveniently permit the feature that an occupant excitation parameters is taken into account in setting the value of cruise_set-speed (and/or LSP_set-speed) to be provided as an optional extra in a vehicle in a convenient manner. That is, the feature may be provided in some embodiments without a requirement substantially to change a configuration of an LSP control function or cruise control function downstream of the provision of a value of LSP_set-speed or cruise_set-speed. Other arrangements are also useful.

In some embodiments, where the value of Psng_Excit_v has fallen below user_set-speed, an audible and/or visual indication may be provided to a driver. The driver may be required to provide a confirmatory input to the LSP control system 12 (or cruise control system 16) when the value of Psng_Excit_v subsequently rises towards user_set-speed, following receipt of which the LSP control system 12 (or cruise control system 16) may cause the vehicle 100 to operate in accordance with the increased value of LSP_set-speed or cruise_set-speed subject to a limit set by the value of user_set-speed.

Figure 10:
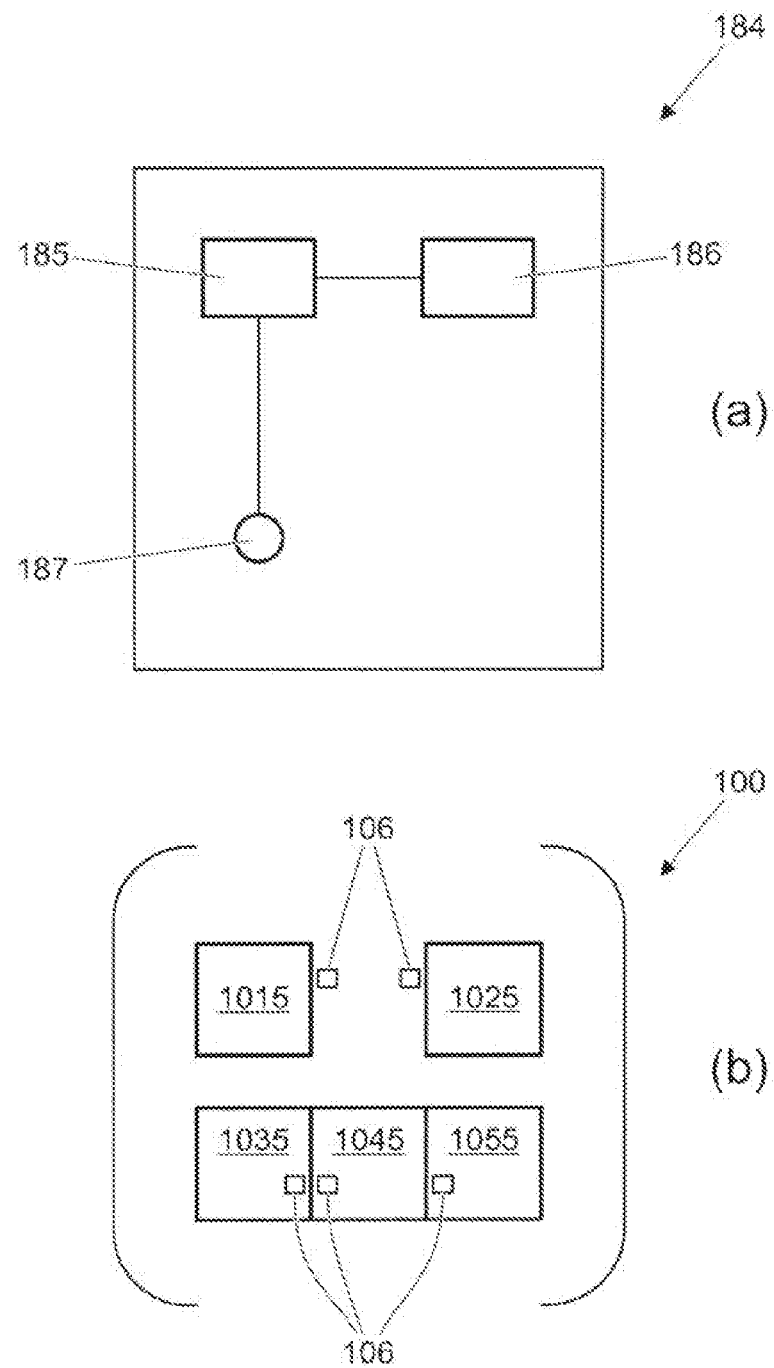
FIG. 10 shows (a) a console installed in a vehicle according to an embodiment of the present invention and (b) a plan view of a cabin of a vehicle according to an embodiment of the present invention.

FIG. 10(*a*) shows a console 184 of the vehicle 100 of FIG. 1. The console has a user operable dial 187 allowing a user to provide a control signal to a processor 185 associated with the LSP control system 12. The processor is operable to store and retrieve data from a memory 186 also associated with the LSP control system 12.

In the embodiment of FIG. 1, the dial 187 allows adjustment of the value of the parameter Psng_Excit (increase or decrease) that is input to function block 301 of FIG. 8. In the present embodiment the dial 187 is arranged to cause an offset to be added to or subtracted from the value of Psng_Excit that is input to function block 301. This has the effect of changing the level of occupant excitation that is considered to be an optimum trade-off between occupant comfort and vehicle speed. Thus, the value of target acceleration tgt_accel determined by function block 303 will tend to cause the vehicle to accelerate to higher speeds or decelerate to lower speeds depending on whether the value of Psng_Excit is reduced or increased.

In some alternative embodiments, the dial 187 allows adjustment of a reference signal value against which the LSP control system 12 compares the instant value of Psng_Excit in order to determine the value of tgt_accel. The system 12 obtains a difference value corresponding to the difference between the reference signal and instant value of Psng_Excit, and obtains a value of tgt_accel in dependence on the difference value. By adjusting the value of the reference signal, the difference value may be adjusted and hence the value of tgt_accel for a given value of Psng_Excit may be adjusted.

The system 12 may be configured to store data in respect of user adjustment of the value of Psng_Excit (or a reference value in some embodiments as noted above) and associate the data with a particular user. The system 12 may store data corresponding to user adjustment in a memory thereof and recall the data when the user is present. In some embodiments the system 12 may distinguish between users, storing adjustment data set by respective users and recalling the data according to the identity of the user. Users may be distinguished based on their seat adjustment configuration, their key fob identity, by means of facial recognition or by any other suitable means.

The LSP control system 12 is also operable to receive data indicative of seat occupancy of the vehicle. That is, data indicative of whether a given seat of the vehicle other than a driver's seat is occupied. FIG. 10(*b*) is a plan view of a cabin of a vehicle according to an embodiment of the invention showing seats 101S to 105S. The LSP system 12 receives data corresponding to a state of a switch embedded in a seat belt buckle 106 associated with each seat 101S-105S. If the state of the switch indicates that the buckle 106 is fastened, the LSP system 12 considers that the seat associated with the buckle is occupied. If the state of the switch indicates the buckle 106 is unfastened, the LSP system 12 considers that the seat associated with the buckle 106 is unoccupied. Seat occupancy may in addition or instead be determined by sensors in each seat or by means of an infrared or visible light camera arranged to observe the interior of the occupant compartment. Other means for determining seat occupancy are also useful.

The system may be configured to store data in respect of seat occupancy when a user over-rides the system 12 to increase or reduce vehicle speed for a given value of Psng_Excit output by the circuit of FIG. 6. The stored data may for example include information in respect of the number of occupants, such as data in respect of whether there is a single occupant or a plurality of occupants. The system 12 may be operable to recall the data if at a future date the vehicle determines that seat occupancy data stored by the system 12 corresponds to current seat occupancy. Thus, if a user adjusts the system 12 to allow higher speeds when there is only one occupant but only lower speeds when there is more than one occupant, the system 12 may automatically adjust the value of Psng_Excit (or reference signal value) in a similar manner in the future, in dependence on instant seat occupancy data.

Other arrangements are also useful.

It will be understood that the embodiments described above are given by way of example only and are not intended to limit the invention, the scope of which is defined in the appended claims.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. A speed control system for a vehicle, comprising an electric controller, the electric controller being configured to:

automatically cause a vehicle to operate in accordance with a target speed value, receive information relating to movement of at least a portion of a body of an occupant relative to a vehicle, and adjust automatically the value of the target speed value in dependence on said information, wherein the electric controller is configured to receive information relating to movement of at least a portion of a body of an occupant relative to a vehicle by being configured to receive electrical signals indicative of movement of at least a portion of a body of an occupant relative to a vehicle.

2. A system according to claim 1 wherein the electric controller is configured to adjust automatically the value of the target speed value in dependence on said information by outputting a signal to automatically adjust the value of the target speed value.

3. A system according to claim 1 wherein the controller is configured to determine the target speed value in dependence at least in part on a signal indicative of a measured comfort level, the signal indicative of measured comfort level being determined at least in part in dependence on the movement of the at least a portion of the body of an occupant.

4. A system according to claim 3 wherein the controller is further configured to determine an amount by which the target speed should be adjusted from the current value in dependence at least in part on the signal indicative of measured comfort level.

5. A system according to claim 3 wherein the controller is configured to determine the target speed value in dependence at least in part on vehicle body pitch angular acceleration, vehicle body roll angular acceleration and vehicle body heave acceleration.

6. A system according to claim 3 wherein the controller is configured to determine the value of the signal indicative of comfort level in dependence at least in part on vehicle body pitch angular acceleration, vehicle body roll angular acceleration and vehicle body heave acceleration.

7. A system according to claim 3 wherein the controller is configured to determine the target speed value in further dependence on at least one parameter associated with movement of the vehicle over terrain selected from amongst: steering angle, vehicle speed, steering angle as a function of vehicle speed, a value of driving surface side slope, a driving surface gradient, and an amount of vehicle suspension articulation or suspension warp.

8. A system according to claim 3 wherein the controller is configured to determine a comfort derived maximum speed value dependent upon the signal indicative of comfort level and at least one further maximum speed value, the system being operable to cause the value of target speed to be set to the lower of the comfort derived maximum speed value and the at least one further maximum speed value.

9. A system according to claim 8 wherein the at least one further maximum speed value includes a user defined speed value corresponding to a maximum speed at which the user wishes to travel and/or the at least one further maximum speed value includes a speed value being a maximum speed appropriate to an instant value of at least one further parameter associated with movement of the vehicle over terrain.

10. A system according to claim 3 wherein the controller is configured to iteratively adjust the target speed value to reduce a difference between the signal indicative of measured comfort level and a prescribed value or a prescribed range of values.

11. A system according to claim 10 wherein the controller is configured to calculate a value of desired vehicle acceleration or speed change in dependence on the value of the signal indicative of measured comfort level thereby to adjust the target speed value to reduce the difference between the signal indicative of measured comfort level and prescribed value or a prescribed range of values.

12. A system according to claim 1 wherein the controller is configured to receive a user input electrical signal and based on said user input electrical signal the controller is further configured to manipulate the amount by which the target speed value is adjusted.

13. A system according to claim 12 wherein based on the user input electrical signal the controller is configured to manipulate the value of the signal indicative of measured comfort level thereby to control the amount by which the target speed value is adjusted.

14. A system according to claim 13 wherein based on the user input electrical signal the controller is configured to manipulate a value of a reference signal, the controller being further configured to compare the reference signal to the signal indicative of measured comfort thereby to control the amount by which the target speed value is adjusted.

15. A system according to claim 14 wherein the controller is configured to control the amount by which the target speed value is adjusted in dependence upon the difference between the manipulated value of the reference signal and the signal indicative of measured comfort.

16. A system according to claim 1 wherein the controller is configured to adjust the target speed value in dependence on data in respect of seat occupancy.

17. A system according to claim 1 further comprising an imaging device that, in use, monitors movement of the at least a portion of the body of an occupant.

18. A vehicle comprising a system according to claim 1.

19. A method of operating a speed control system of a vehicle, said method comprising:

automatically causing a vehicle to operate in accordance with a target speed value;

receiving information relating to movement of at least a portion of a body of an occupant relative to a vehicle; and adjusting automatically the value of the target speed value in dependence at least in part on a signal indicative of a measured comfort level, the signal indicative of measured comfort level being determined at least in part in dependence on the movement of the at least a portion of the body of an occupant.

20. A non-transitory carrier medium carrying a computer readable code for controlling a vehicle to carry out the method of claim 19.

* * * * *